US012473763B2

(12) United States Patent
Larson

(10) Patent No.: US 12,473,763 B2
(45) Date of Patent: Nov. 18, 2025

(54) DETENT HINGE

(71) Applicant: Reell Precision Manufacturing Corporation, St. Paul, MN (US)

(72) Inventor: George Larson, Roseville, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 175 days.

(21) Appl. No.: 18/237,379

(22) Filed: Aug. 23, 2023

(65) Prior Publication Data

US 2024/0068286 A1 Feb. 29, 2024

Related U.S. Application Data

(60) Provisional application No. 63/400,171, filed on Aug. 23, 2022.

(51) Int. Cl.
*E05D 11/10* (2006.01)
*E05D 3/02* (2006.01)

(52) U.S. Cl.
CPC ............ *E05D 11/1078* (2013.01); *E05D 3/02* (2013.01); *E05D 2011/1035* (2013.01); *E05Y 2201/218* (2013.01)

(58) Field of Classification Search
CPC ............. E05D 11/1078; E05D 11/1028; E05D 11/1042; E05D 11/1085; E05D 2011/1035; E05D 2011/1092
See application file for complete search history.

(56) References Cited

U.S. PATENT DOCUMENTS 571,133 A 11/1896 Hoffman
700,435 A * 5/1902 MacLean ............ E05D 11/1078 16/330

(Continued)

FOREIGN PATENT DOCUMENTS

FR 2771769 6/1999
FR 3012505 5/2015

(Continued)

*Primary Examiner* — Jeffrey O'Brien
(74) *Attorney, Agent, or Firm* — Dicke, Billig & Czaja, PLLC

(57) ABSTRACT

One aspect is a detent hinge device having a first cam component with at least one spline and an axial cam face, the first cam component having a root diameter and an outer diameter. A second cam component has at least one spline and an axial cam face, the second cam component having a root diameter and an outer diameter. Each of the first and second cam components are aligned on an axis, wherein the cam faces of the first inner and first outer cam components face each other. An axial spring acts on the first cam component forcing it against the second cam component. An axial retention element securing each of the first and second cam components and axial spring on the axis. A first mounting bracket has splines on an inner surface. The first mounting bracket contains the first cam component such that the splines of the first mounting bracket engage the splines of the first cam component thereby transferring torque from the first cam component to the first mounting bracket via the splines. A second mounting bracket has splines on an inner surface. The second mounting bracket contains the second cam component such that the splines of the second mounting bracket engage the splines of the second cam component thereby transferring torque from the second cam component to the second mounting bracket via the splines. The first and second cam components comprise the same shape.

16 Claims, 30 Drawing Sheets

(56) References Cited

U.S. PATENT DOCUMENTS

| | | | | | |
|---|---|---|---|---|---|
| 769,035 | A * | 8/1904 | Walter | E05D 11/1078 16/330 |
| 803,747 | A | 11/1905 | Elvin | |
| 1,078,002 | A * | 11/1913 | Schrey | E05D 11/1078 16/330 |
| 1,429,416 | A * | 9/1922 | Thomas | E05D 5/10 16/386 |
| 1,440,713 | A * | 1/1923 | Ausbourne | E05D 5/10 16/324 |
| 1,946,837 | A * | 2/1934 | Clayton | E05D 11/1078 16/330 |
| 3,637,186 | A * | 1/1972 | Greenfield | B60R 1/0617 248/478 |
| 5,274,882 | A | 1/1994 | Persson | |
| 5,412,842 | A | 5/1995 | Riblett | |
| 5,704,094 | A | 1/1998 | Hartigan et al. | |
| 5,765,263 | A | 6/1998 | Bolinas | |
| 5,774,938 | A * | 7/1998 | Kent | E05D 11/1007 16/332 |
| 5,950,281 | A * | 9/1999 | Lu | H04M 1/0216 16/337 |
| 5,970,819 | A | 10/1999 | Katoh | |
| 6,012,201 | A * | 1/2000 | Mitts | E05D 11/1085 16/334 |
| 6,033,015 | A | 3/2000 | Husted | |
| 6,141,831 | A * | 11/2000 | Novin | G06F 1/1679 16/334 |
| 6,178,598 | B1 | 1/2001 | Creely, III et al. | |
| 6,282,752 | B1 * | 9/2001 | Kluting | E05D 11/1085 16/322 |
| 6,757,940 | B2 * | 7/2004 | Lu | G06F 1/1681 16/303 |
| 6,904,644 | B2 | 6/2005 | Oshima et al. | |
| 6,941,617 | B2 | 9/2005 | Pinto | |
| 6,948,217 | B2 * | 9/2005 | Higano | G06F 1/1616 16/303 |
| 7,062,817 | B2 * | 6/2006 | Lee | E05F 1/1223 16/334 |
| 7,065,834 | B2 * | 6/2006 | Lowry | H04M 1/0216 16/334 |
| 7,096,536 | B2 | 8/2006 | Johnson | |
| 7,127,911 | B2 | 10/2006 | Nam et al. | |
| 7,228,596 | B2 | 6/2007 | Kang | |
| 7,243,394 | B2 | 7/2007 | Kao | |
| 7,251,859 | B2 | 8/2007 | Oshima et al. | |
| 7,320,152 | B2 | 1/2008 | Lowry et al. | |
| 7,346,960 | B2 | 3/2008 | Higano et al. | |
| 7,373,692 | B2 | 5/2008 | Kfoury | |
| 7,383,618 | B2 | 6/2008 | Lu et al. | |
| 7,555,119 | B2 | 6/2009 | Yang | |
| 7,614,118 | B2 | 11/2009 | Sato et al. | |
| 7,631,398 | B1 | 12/2009 | Lin | |
| 7,699,378 | B2 | 4/2010 | Smith et al. | |
| 7,712,186 | B2 | 5/2010 | Kang | |
| 7,895,710 | B2 | 3/2011 | Takagi et al. | |
| 7,952,858 | B2 | 5/2011 | Lee et al. | |
| 8,432,677 | B2 | 4/2013 | Duan et al. | |
| 8,544,151 | B2 * | 10/2013 | Courbon | E05D 11/1078 16/334 |
| 8,555,465 | B2 * | 10/2013 | Novin | E05D 11/082 16/342 |
| 8,701,249 | B2 * | 4/2014 | Ahn | G06F 1/1681 16/326 |
| 8,752,248 | B2 * | 6/2014 | Nakasone | E05D 7/1011 16/337 |
| 8,875,348 | B2 * | 11/2014 | Kossett | G06F 1/1681 16/342 |
| 8,943,650 | B2 | 2/2015 | Anderson et al. | |
| 9,291,385 | B2 | 3/2016 | Hwang et al. | |
| 9,448,583 | B1 | 9/2016 | Lee et al. | |
| 10,151,128 | B2 * | 12/2018 | Hatano | G06F 1/1681 |
| 11,435,024 | B2 * | 9/2022 | Chen | E05F 1/1215 |
| 2005/0138771 | A1 * | 6/2005 | Su | H04M 1/0216 16/330 |
| 2006/0265838 | A1 | 11/2006 | Duan et al. | |
| 2007/0245523 | A1 * | 10/2007 | Yang | H04M 1/0216 16/330 |
| 2008/0060165 | A1 * | 3/2008 | Centmayer | F16D 63/006 16/334 |
| 2009/0260183 | A1 * | 10/2009 | Chen | H04M 1/0214 16/223 |
| 2010/0064478 | A1 * | 3/2010 | Duan | H04M 1/0216 16/307 |
| 2011/0302743 | A1 | 12/2011 | Kim et al. | |
| 2015/0345203 | A1 | 12/2015 | Vanini | |
| 2019/0338569 | A1 | 11/2019 | Manly | |
| 2020/0370348 | A1 | 11/2020 | Naganuma | |

FOREIGN PATENT DOCUMENTS

| | | | | |
|---|---|---|---|---|
| JP | 2009-264588 | | 11/2009 | |
| JP | 2010025209 | A * | 2/2010 | |
| KR | 20040073640 | | 8/2004 | |
| KR | 101064697 | | 6/2011 | |
| KR | 101669419 | | 6/2011 | |
| KR | 101343915 | | 8/2013 | |
| WO | WO-2007029546 | A1 * | 3/2007 | H04M 1/022 |
| WO | WO-2024105003 | A1 * | 5/2024 | E05F 1/1223 |

* cited by examiner

DETENT HINGE

CROSS REFERENCE TO RELATED APPLICATIONS

This Non-Provisional patent application claims the benefit of the filing date of U.S. Provisional Patent Application Ser. No. 63/400,171, filed Aug. 23, 2022, entitled "DETENT HINGE," which is herein incorporated by reference.

BACKGROUND

The present invention relates to the field of hinges, and more particularly, to a detent hinge featuring cam surfaces. Detent hinges have applications in various industries where controlled movement and secure positioning are required, such as automotive interiors, furniture manufacturing, and household appliances.

Hinges are widely used in numerous applications to allow the rotation or pivoting of two connected objects, enabling opening and closing movements. Conventional hinges typically comprise a pin or shaft connecting two plates or leaves, allowing them to rotate relative to each other. While traditional hinges serve their intended purpose of facilitating rotational motion, they often lack the ability to maintain specific positions or resist accidental movement due to external forces or vibrations.

To address the limitations of conventional hinges, detent hinges provide a means to achieve specific positions and resist unintended motion through the inclusion of a detent mechanism. This mechanism often employs a combination of spring-loaded balls, notches, or pins that engage with each other to create discrete detent positions or hold the hinge in a fixed position.

While detent hinges have improved the ability to maintain specific positions, they still face certain challenges. One particular issue is the difficulty in achieving smooth and controlled movement during the transition between detent positions. The abrupt transitions between the detents can lead to undesirable noise, jarring movement, or even damage to the hinge and the connected objects.

Innovations in detent hinge design have attempted to overcome these challenges. One notable advancement includes the incorporation of cam surfaces within the hinge mechanism. By employing cam surfaces, the transition between detent positions can be made smoother, controlled, and virtually noiseless. The cam surfaces can facilitate a gradual increase or decrease in resistance during rotation, providing enhanced user experience and prolonged hinge durability. While many refinements within cam faces are known to meet specific needs for detent hinge applications; they have driven complex designs with a high number of parts which increases costs. Additionally, often the size needed to generate the system required torque leads to difficulty of fitting the hinge into the system due to the diameter of the cam.

In conclusion, the prior art has recognized the need for improved detent hinges that provide smooth and controlled movement between detent positions, high torque and low cost.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1:
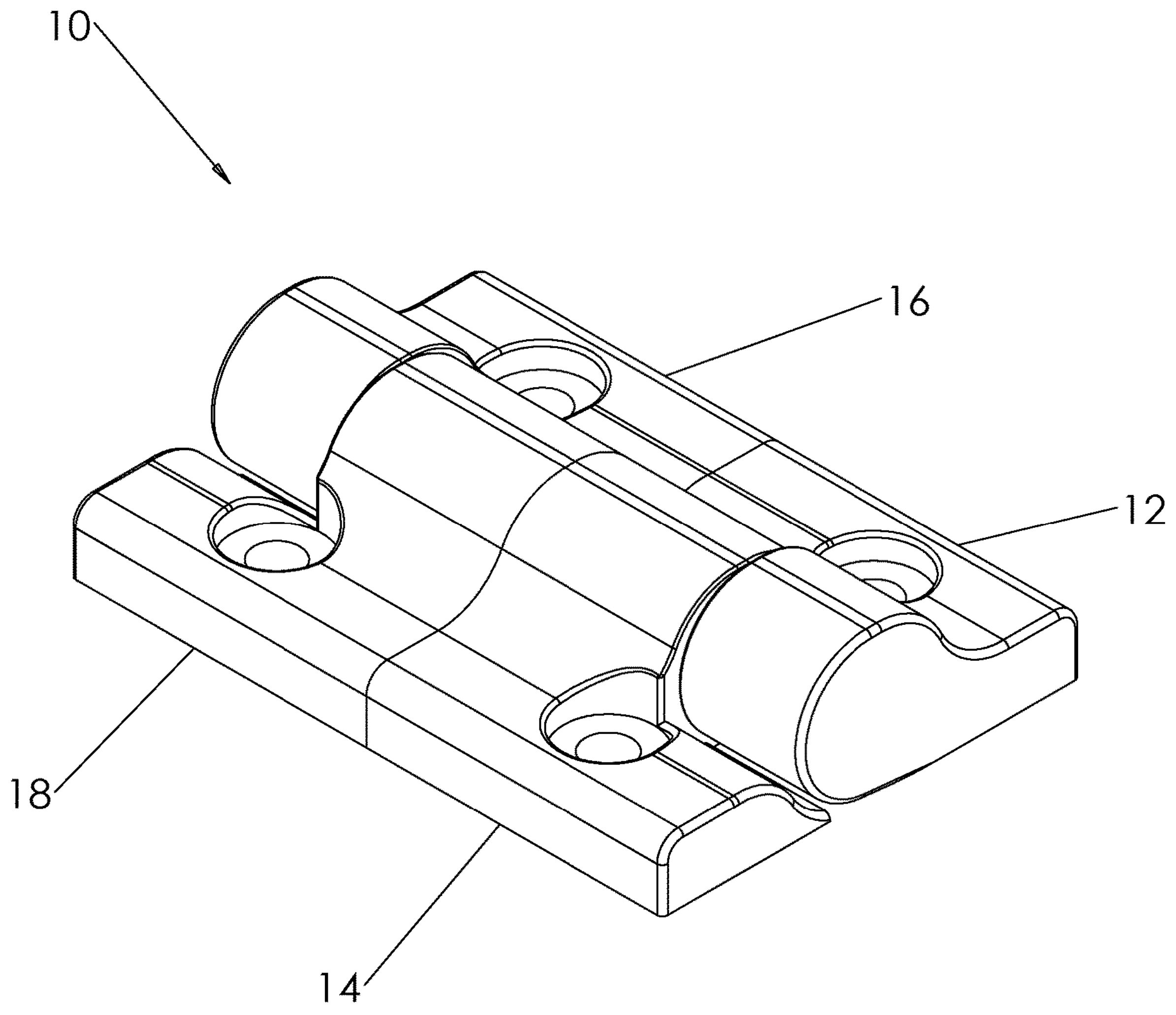
FIG. 1 illustrates a perspective view of a detent hinge device in accordance with one embodiment.

FIG. 1 illustrates detent hinge device 10 in accordance with one embodiment. In one embodiment detent hinge device 10 includes first and second outer brackets 12 and 16, and first and second inner brackets 14 and 18. Brackets 12-18 can be fixed to various bodies in order to hinge one body relative to another. In one embodiment, detent hinge device 10 incorporates cam surfaces to enable smooth and controlled movement between detent positions, maximizing torque, minimizing wear, and improve the overall user experience.

Figure 2:
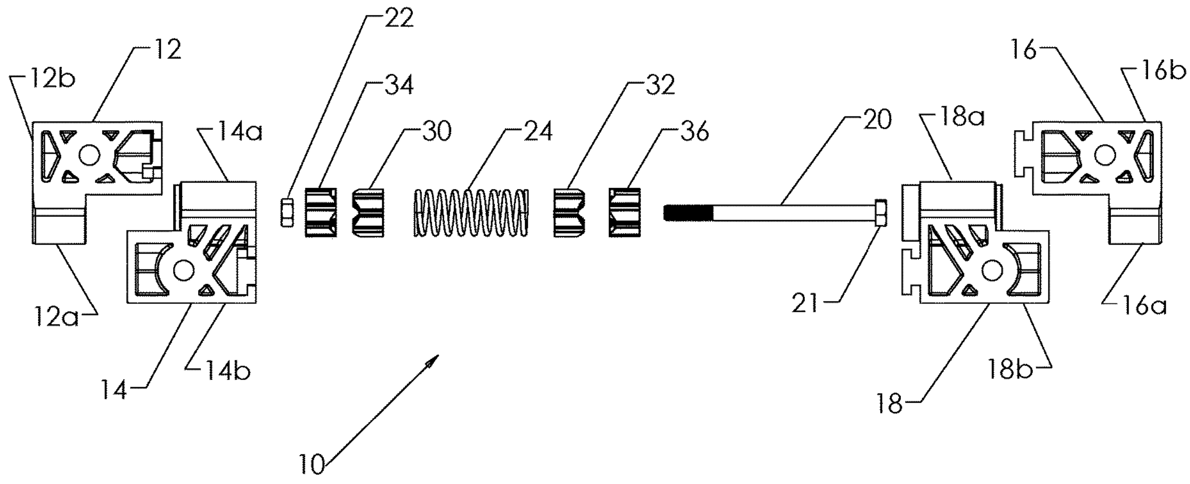
FIG. 2 illustrates an exploded view of the detent hinge device of FIG. 1 in accordance with one embodiment.

FIG. 2 illustrates and exploded view of detent hinge 10 in accordance with one embodiment. In this view, the various components of detent hinge device 10 are visible. In one embodiment, detent hinge device 10 includes first and second outer brackets 12 and 16, first and second inner brackets 14 and 18, bolt 20, nut 22, spring 24, first and second inner cam components 30 and 32, and first and second outer cam components 34 and 36. In one embodiment, first outer bracket 12 includes barrel portion 12*a* and flange portion 12*b*, second outer bracket 16 includes barrel portion 16*a* and flange portion 16*b*, first inner bracket 14 includes barrel portion 14*a* and flange portion 14*b*, and second inner bracket 18 includes barrel portion 18*a* and flange portion 18*b*. In one embodiment, bolt 20 includes bolt head 21.

Figure 3A:
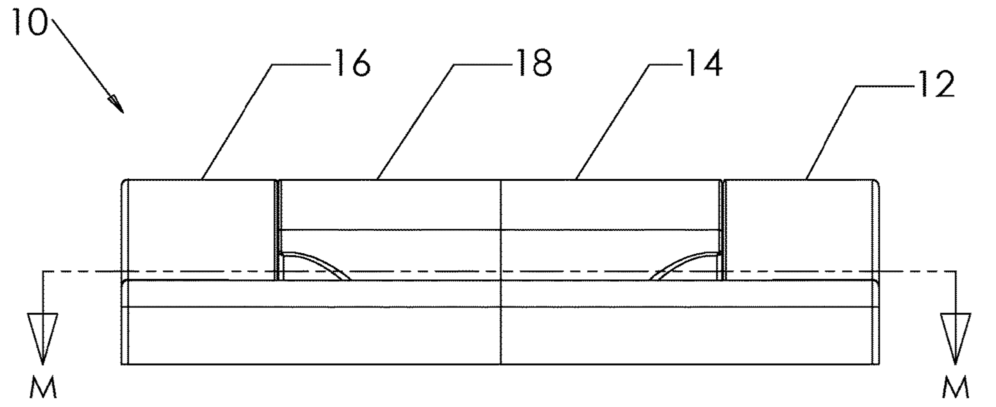
FIG. 3A illustrates a side view of the detent hinge device of FIG. 1 in accordance with one embodiment.
Figure 3B:
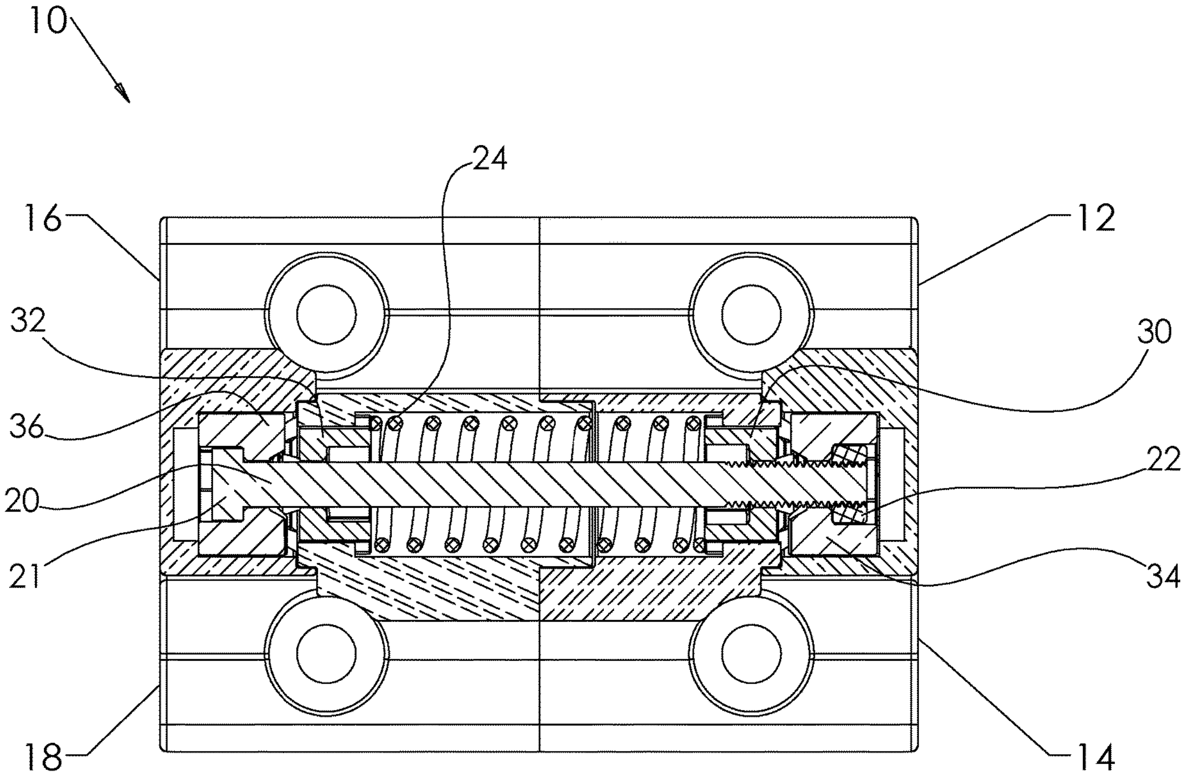
FIG. 3B illustrates a sectional view of the detent hinge device of FIG. 3A taken at line M-M in accordance with one embodiment.

FIG. 3A illustrates detent hinge device 10 viewed from the back, and includes reference line M-M. FIG. 3B illustrates a sectional view of detent hinge device 10 taken at line M-M in accordance with one embodiment. In one embodiment, when assembled detent hinge device 10 includes first and second inner cam components 30 and 32 coupled respectively within the barrel portions of first and second inner brackets 14 and 18. In addition, first and second outer cam components 34 and 36 are coupled respectively within the barrel portions of first and second outer brackets 12 and 16. In one embodiment, each of cam components 30-36 have a center hole through which bolt 20 extends. Furthermore, spring 24 is secured over bolt 20 and between first inner cam component 30 and second inner cam component 32. Bolt 20 includes a bolt head 21 on one end and nut 22 is secured to threads at the other end. In this way, bolt 20 secures cam components 30-36 and spring 24 axially.

As will be further discussed below, each of cam components 30-36 include cam faces. The cam faces of first inner and outer cam components 30 and 34 are oriented toward each other, and the cam faces of second inner and outer cam components 32 and 36 are oriented toward each other. In one embodiment, spring 24 is a compression spring that acts on first inner cam component 30 and second inner cam component 32 keeping them respectively forced outward and against outer cam components 34 and 36. In one embodiment, outer cam components 34 and 36 are prevented from outward axial movement by bolt head 21 and nut 22.

In operation, when inner brackets 14 and 18 are rotated relative to outer brackets 12 and 16, outer cam components 34 and 36 stay fixed relative to outer brackets 12 and 16, transmitting torque through a drive feature like a spline interface (further discussed below) to outer brackets 12 and 16. Meanwhile, inner cam components 30 and 32 travel axially, compressing spring 24 and sliding in the inner bracket drive features, and transmit torque to the inner brackets 14 and 16 through a spline interface.

In one embodiment, detent hinge device 10 provides symmetric torque and provides the same torque profile in both directions of relative rotation of inner and outer brackets 12, 14, 16, 18. In one embodiment, all of first and second inner cam components 30 and 32, and first and second outer cam components 34 and 36 are common components. They are identical parts, such that they are all sized and shaped the same, and are manufactured the same way. For example, when cam components are formed from powered metal, metal powder is compacted into a die and then sintered. Because all cam components are sized and shaped the same, identically shaped dies are used for forming all the components. Using common parts having the same overall size and shape for each of inner and outer cam components 30, 32, 34 and 36 significantly improves cost in needing only a single part to function in four different locations of detent hinge device 10. It also lowers tooling and inventory cost. Furthermore, it eliminates the risk of assembling the wrong cams in the wrong places.

Figure 4A:
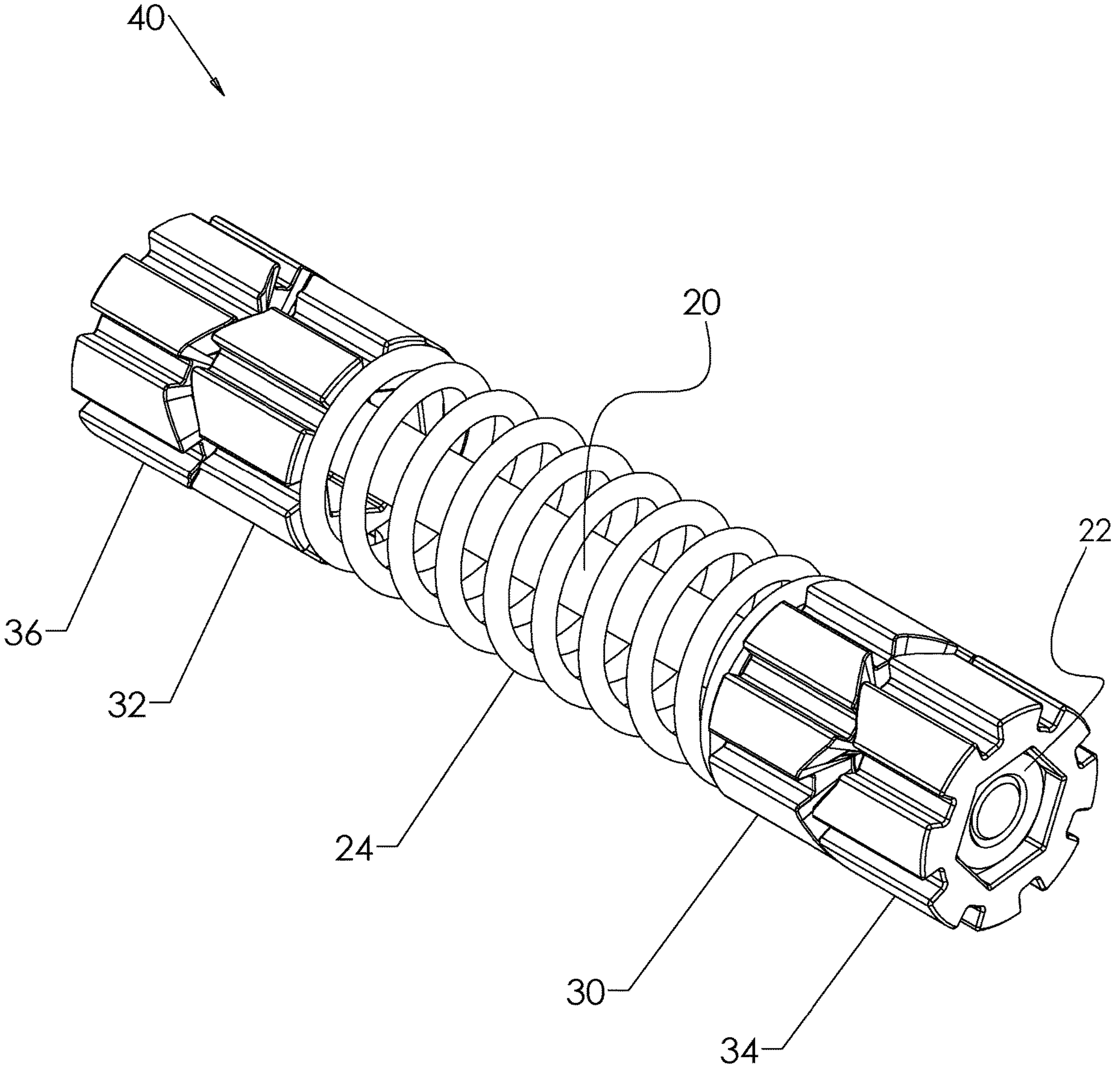
FIGS. 4A-4B illustrate perspective and side views of a torque engine for a detent hinge device in accordance with one embodiment.
Figure 4B:
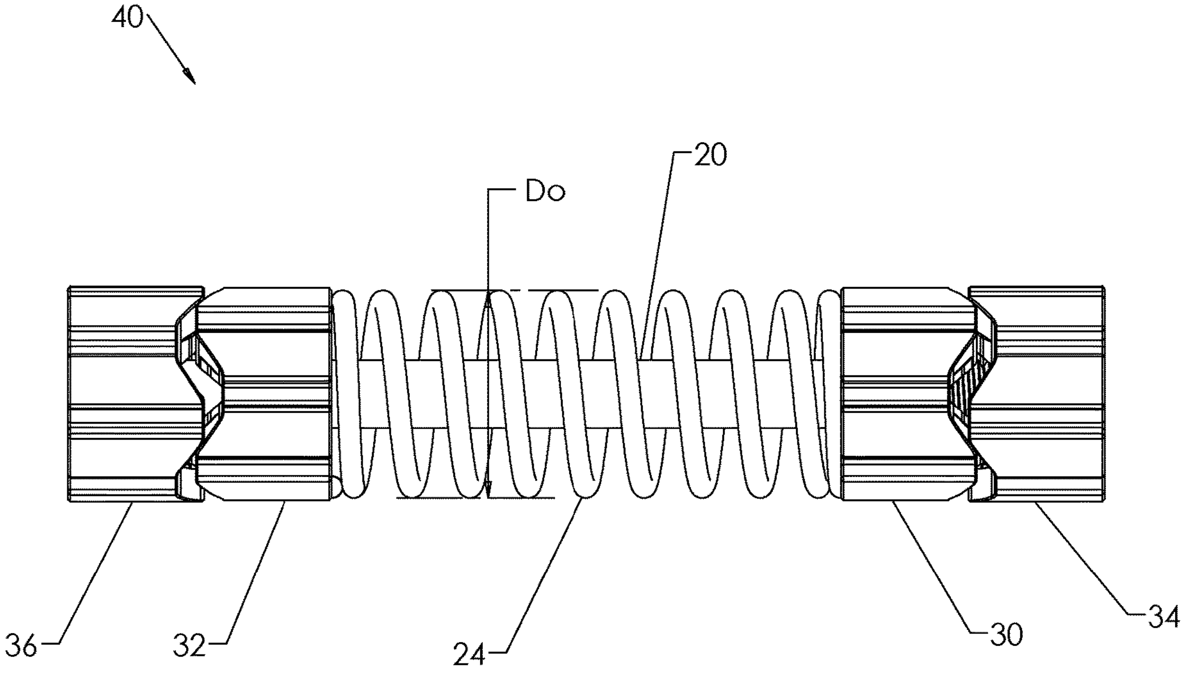

FIGS. 4A-4B illustrate perspective and side views of a torque engine 40 for detent hinge device 10 in accordance with one embodiment. In one embodiment, torque engine 40 includes inner cam components 30 and 32 one either end of spring 24, with outer cam components 34 and 36 placed respectively adjacent inner cam components 30 and 32. Bolt 20 extends through a center opening of each of cam components 30-36 and through spring 24. Bolt 20, bolt head 21 and nut 22 axially secure cam components 30-36 and spring 24 with bolt head 21 on one end and nut 22 at the other end. Bolt head 20 and nut 22 are contained by outer cam components 34 and 36 and are not able to back off during use, because they are held rotationally by outer brackets 12 and 16. This allows a standard nut to be used for nut 22, instead of a lock nut.

Spring 24 is placed on bolt 20 and between inner cam components 30 and 32 under compression such that spring 24 forces the inner cam components 30 and 32 against outer cam components 34 and 36. The amount of compression that is loaded in spring 24 is readily adjustable by turning nut 22 on bolt 20. In one embodiment, bolt head 21 and nut 22 are contained by the first and second outer cam components 34 and 36 and are not able to back off during use because they are held rotationally by first and second outer brackets 12 and 16. This allows a standard nut to be used instead of a lock nut.

In one embodiment, cam components 30-36 provide the same torque profile in both directions of relative rotation. Also in one embodiment, cam components 30-36 are made with powdered metal, which has a cost savings compared to MIM cams. Also, torque performance is much better than plastic or zinc cams. The cams also have a contact relief area on the inner portion of the cam ramps to avoid contact in the steeper areas. In one embodiment, spring 24 has an outer diameter $D_O$.

As inner cam components 30 and 32 rotated with respect to outer cam components 34 and 36, the ramped cam faces push inner cam components 30 and 32 axially inward against spring 24, as seen in FIG. 4B.

FIGS. 5A-5F illustrate inner and outer cam components 30, 32, 34, and 36 for detent hinge device 10 in accordance with one embodiment. In one embodiment, each of inner and outer cam components 30, 32, 34, and 36 are common, so only one part is illustrated in the figures since it functions as all four cam components. In one embodiment, inner and outer cam components 30, 32, 34, and 36 include a plurality of splines 50 and grooves 52 on their outer periphery. In one embodiment, inner and outer cam components 30, 32, 34, and 36 include cam face 56, which have ramped portions projecting out from face 56 and other ramped portions that retract into face 56.

Figure 5A:
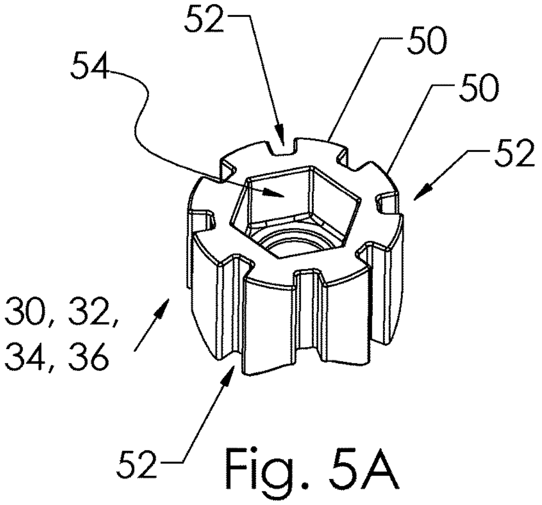
FIGS. 5A-5F illustrate a cam component for a detent hinge device in accordance with one embodiment.
Figure 5D:
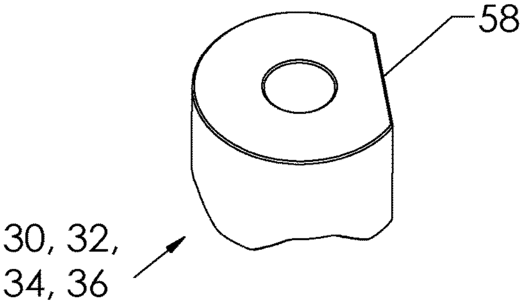
Figure 5B:
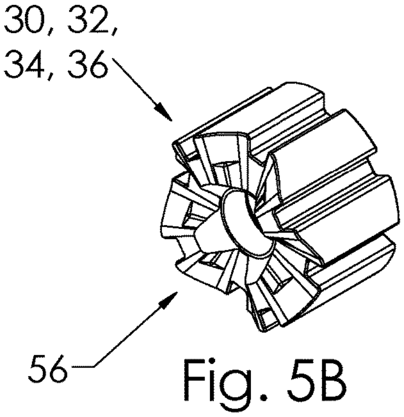
Figure 5E:
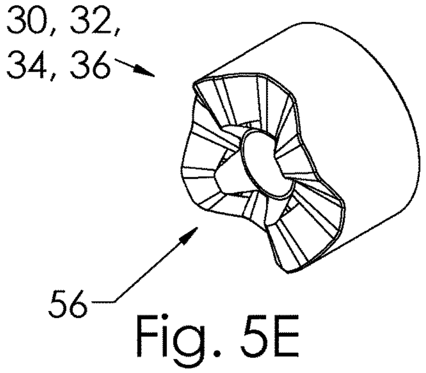
Figure 5C:
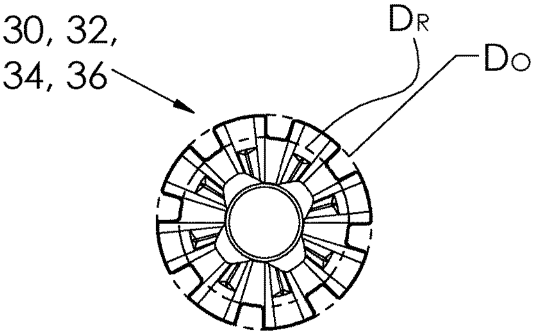

As illustrated in FIG. 5C, inner and outer cam components 30, 32, 34, and 36 include a root diameter $D_R$ and an outer diameter $D_O$. As illustrated, splines 50 extend radially outward from the root diameter $D_R$ to the outer diameter $D_O$. Grooves 52 separate the plurality of splines 50. In one embodiment, 8 equally spaced apart splines 50 are located on inner and outer cam components 30, 32, 34, and 36, but more or fewer splines of different spacing can also be used.

Splines 50, located between the root diameter $D_R$ and an outer diameter $D_O$, are the drive transfer portion of cam components 30, 32, 34, and 36. When cam components 30, 32, 34, and 36 engage complementary splines in brackets 12, 14, 16, and 18, relative rotation of the brackets drives the splines 50 of cam components 30, 32, 34, and 36 thereby transmitting torque through a spline interface with the brackets.

In one embodiment, the outer diameter $D_O$ of spring 24 is larger than the root diameter $D_R$ of cam components 30, 32, 34, and 36. In one embodiment, the outer diameter $D_O$ of spring 24 is approximately the same as the outer diameter $D_O$ of cam components 30, 32, 34, and 36. As such, spring 24 may press on the splines 50, which occupy the radial area around the perimeter of cam components 30, 32, 34, and 36 between the root diameter $D_R$ and an outer diameter $D_O$. This allows more volume for spring 24, larger wire and higher spring forces within a given detent hinge barrel size, giving higher torque density. Splines on inner brackets provide clearance for the spring ends throughout the linear cam motion. Accordingly, detent hinge device 10 provides higher torque density, reduced package size, and improved cost.

Figure 5F:
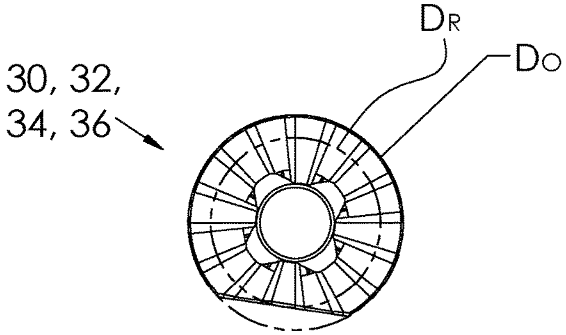

FIGS. 5D-5F illustrates the drive surface 58 of inner and outer cam components 30, 32, 34, and 36. Drive surface 58 extends from the root diameter $D_R$ and an outer diameter $D_O$ of cam components 30, 32, 34, and 36. It is drive surface 58 that engages the corresponding drive surfaces of inner and outer brackets 12, 14, 16, and 18.

Figure 6A:
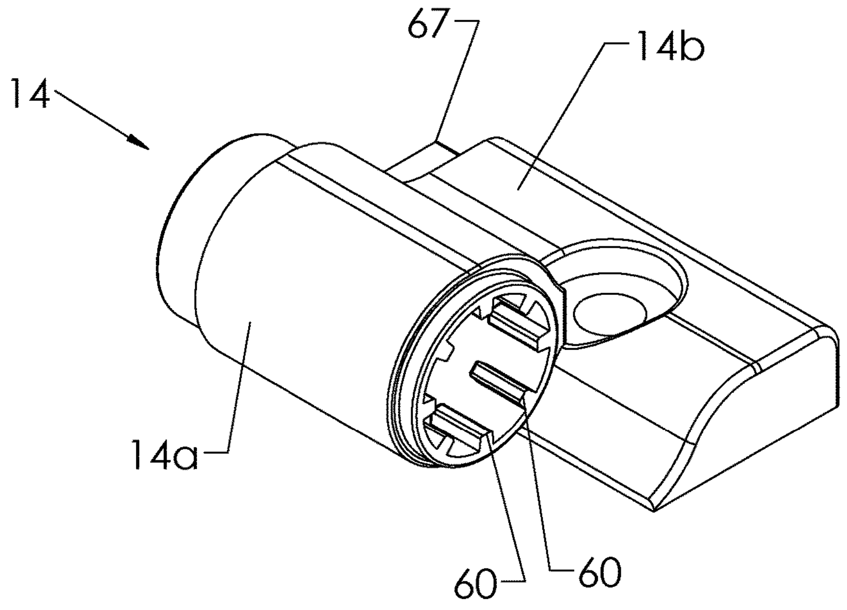
FIGS. 6A-6C illustrate an inner bracket for a detent hinge device in accordance with one embodiment.
Figure 6B:
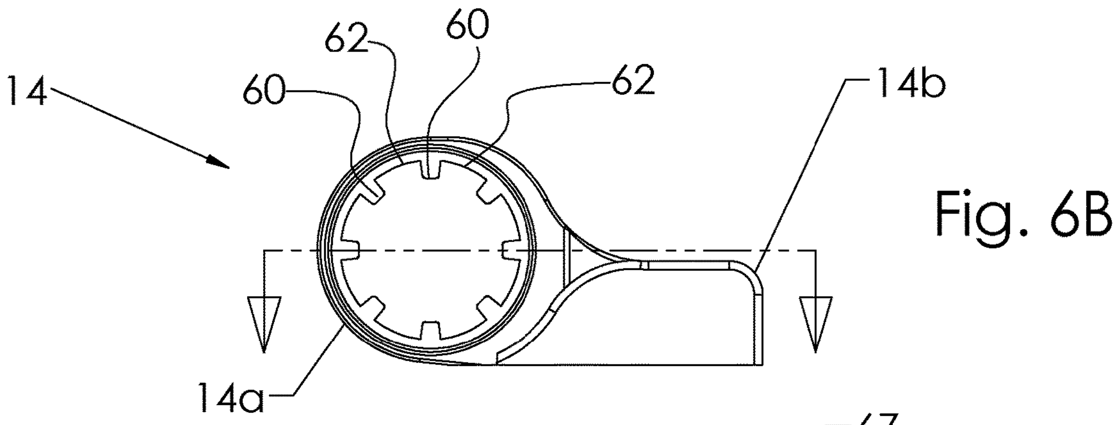
Figure 6C:
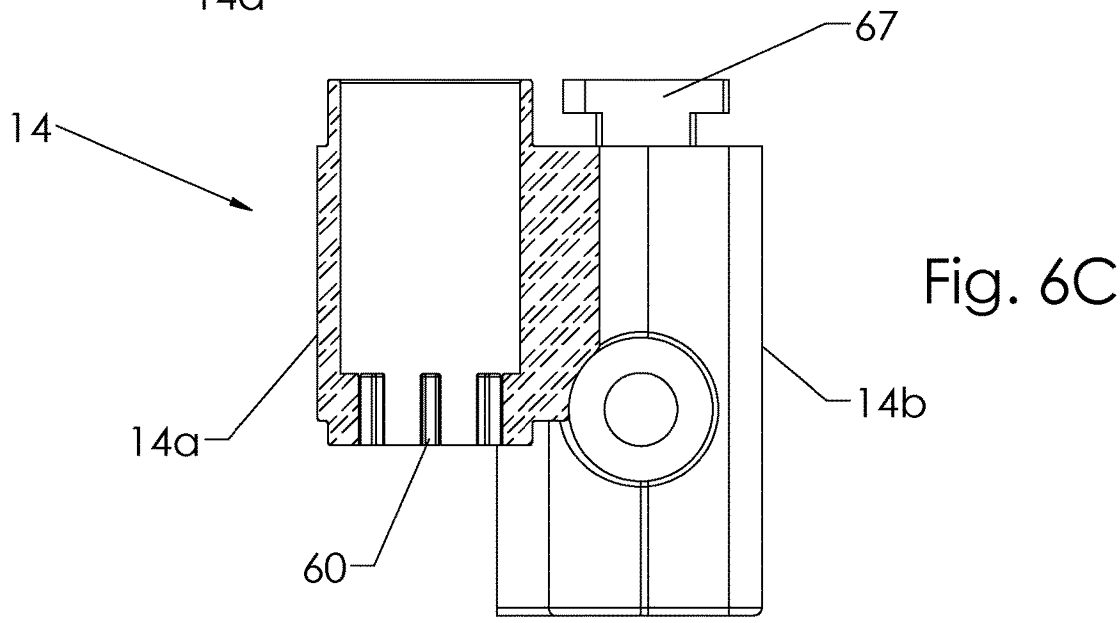

FIGS. 6A-6C illustrate first inner bracket 14 for detent hinge device 10 in accordance with one embodiment. In one embodiment, first inner bracket 14 includes barrel portion 14*a* and flange portion 14*b*. In the illustration, flange portion 14*b* includes an opening, which can be used for securing detent hinge device 10 to an application, such as by using a screw or bolt. Flange portion 14*b* is readily designed in any of a variety of ways to couple detent hinge device 10 to applications where it is desired to rotate one body relative to another.

In one embodiment, barrel portion 14*a* includes drive features such as splines 60 on its inner surface, which are separated by grooves 62. In one embodiment, barrel portion 14*a* of first inner bracket 14 is slid over torque engine 40 such that splines 60 mate with splines 50 from first inner cam component 30. The splines 50/60 and grooves 52/62 of first inner bracket 14 and first inner cam component 30 respectively mate such that there is minimal relative rotation between them about bolt 20. Similarly, second inner bracket 18 includes barrel portion 18*a* and flange portion 18*b*, and barrel portion 18*a* also includes splines on its inner surface, which are separated by grooves. In one embodiment, barrel portion 18*a* of second inner bracket 18 is slid over torque engine 40, on the opposite side of first inner bracket 14, such that splines and grooves of second inner bracket 18 and second inner cam component 32 respectively mate such that there is minimal relative rotation between them about bolt 20. Grooves 60 are designed with a clearance fit to allow axial motion of inner cams 30, 32 during rotation of hinge embodiment 10.

Figure 7A:
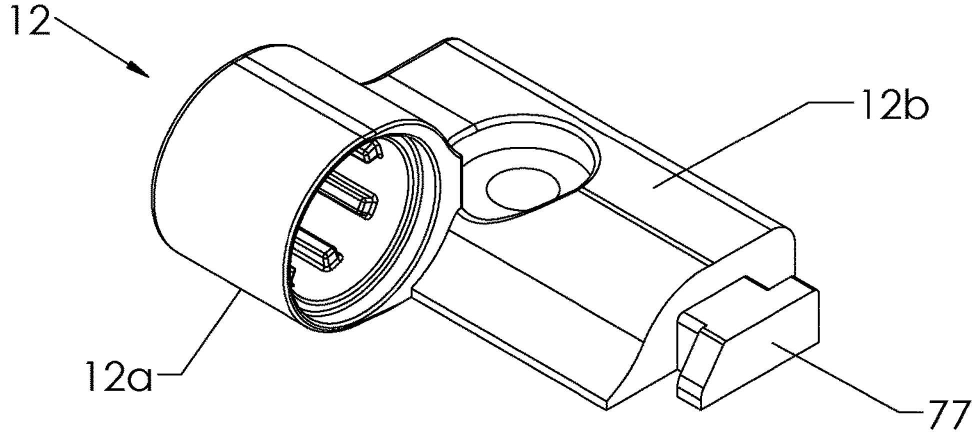
FIGS. 7A-7C illustrate an outer bracket for a detent hinge device in accordance with one embodiment.
Figure 7B:
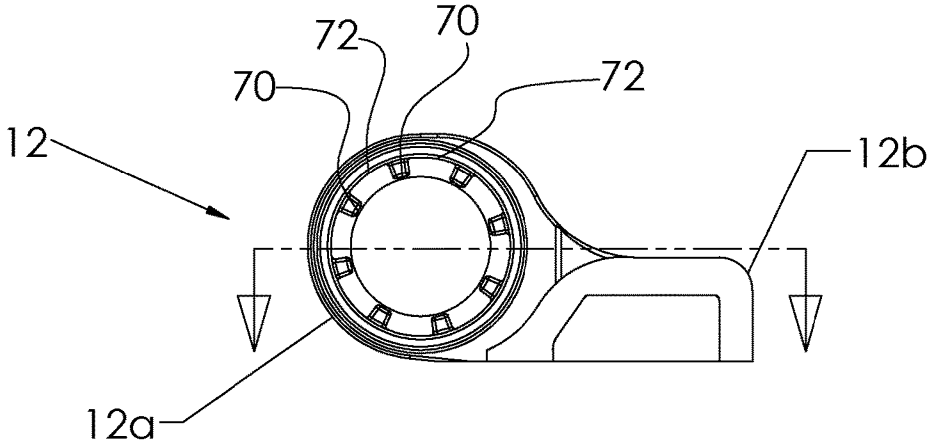
Figure 7C:
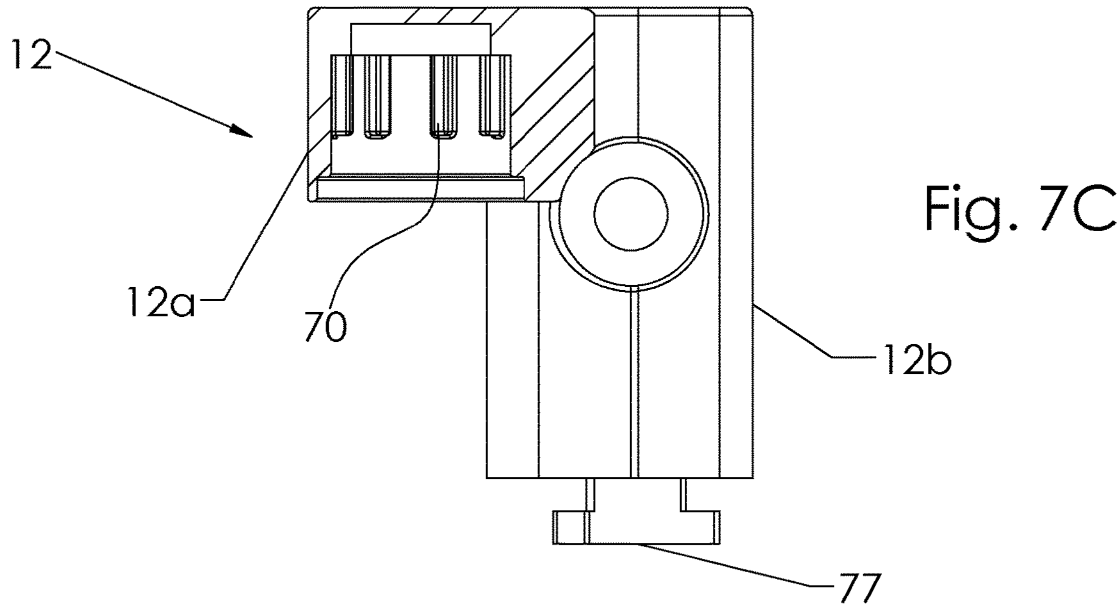

FIGS. 7A-7C illustrate first outer bracket 12 for detent hinge device 10 in accordance with one embodiment. In one embodiment, first outer bracket 12 similarly includes barrel portion 12*a* and flange portion 12*b*. Flange portion 12*b* also may include an opening, which can be used for securing detent hinge device 10 to an application. It is also readily designed in any of a variety of ways to couple detent hinge device 10 to applications where it is desired to rotate one body relative to another.

In one embodiment, barrel portion 12*a* includes drive features such as splines 70 on its inner surface, which are separated by grooves 72. In one embodiment, barrel portion 12*a* of first outer bracket 12 is slid over torque engine 40 such that splines 70 mate with splines 50 from first outer cam component 34. The splines 50/70 and grooves 52/72 of first outer bracket 12 and first outer cam component 34 respectively mate such that there is minimal relative rotation between them about bolt 20. Similarly, second outer bracket 16 includes barrel portion 16*a* and flange portion 16*b*, and barrel portion 16*a* also includes splines on its inner surface, which are separated by grooves. In one embodiment, barrel portion 16*a* of second outer bracket 16 is slid over torque engine 40, on the opposite side of first outer bracket 12, such that splines and grooves of second outer bracket 16 and second outer cam component 36 respectively mate such that there is minimal relative rotation between them about bolt 20. Grooves 70 are designed with an interference or transition fit since no axial motion of outer cams 34, 36 is needed during rotation of hinge embodiment 10.

In one embodiment, inner brackets 14 and 18 are inserted fixed to a first hinged element and outer brackets 12 and 16 are fixed to a second hinged element. flange portions 14*b* and 18*b* are coupled, such as with screws, to the first hinged element such that inner brackets 14 and 18 are fixed thereto. Similarly, flange portions 12*b* and 16*b* are fixed, such as with screws, to the second hinged element such that outer brackets 12 and 16 are fixed thereto.

In operation, when first and second outer brackets 12 and 16 are moved rotationally relative to first and second inner brackets 14 and 18 about bolt 20, first and second outer cams 34 and 36 stay fixed relative to first and second outer brackets 12 and 16, transmitting torque through the spline interface to the outer brackets 12 and 16. First and second inner cams 30 and 32 travel axially, sliding in the splines of first and second inner brackets 14 and 18, and transmit torque to first and second inner brackets 14 and 18. Alternatively, these brackets could include a variety of known drive features besides splines, including but not limited to those shown in FIG. 5D.

In one embodiment, first and second outer brackets 12 and 16 and first and second inner brackets 14 and 18 include coupling features that allow first outer bracket 12 to couple to second outer bracket 16 and allow first inner bracket 14 to couple to second inner bracket 18. For example, tab 67 of first inner bracket 14 is configured to fit within an opening in second inner bracket 18 such that the first and second inner brackets 14 and 18 snap together and rotate together in the operation of detent hinge device 10. Similarly, tab 77 of first outer bracket 12 is configured to fit within an opening in second outer bracket 16 such that the first and second outer brackets 12 and 16 snap together and rotate together in the operation of detent hinge device 10.

Coupling the inner and outer brackets to each other is helpful to maintain hole spacing and leaf position during handling and shipping. This can be done with tabs and slots which counter-rotate into position or press axially and snap into position. If additional security or alternate connections are desired, they could also be heat staked or ultrasonically welded, riveted, press fit or otherwise fastened together.

Figure 8A:
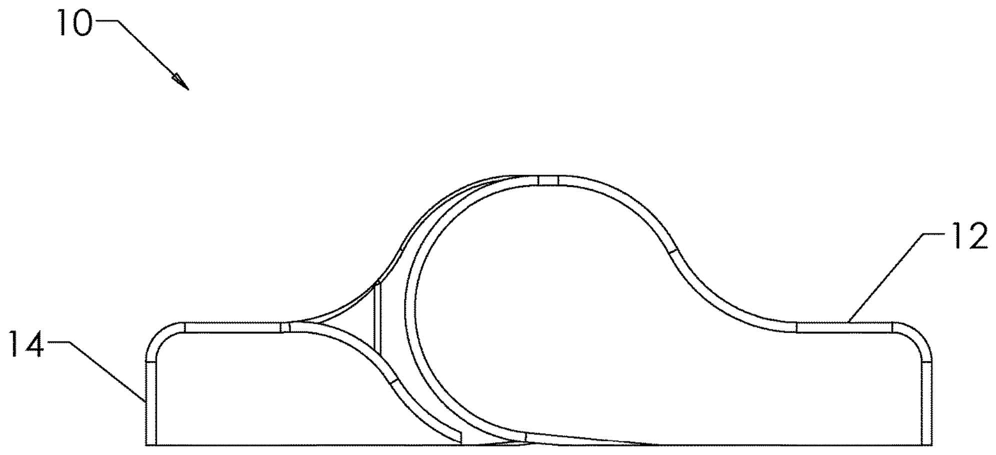
FIG. 8A illustrates a side view of a detent hinge device in a flat position in accordance with one embodiment.

FIG. 8A illustrates detent hinge device 10 in a flat position, that is, the flange portions of first and second outer brackets 12 and 16 and first and second inner brackets 14 and 18 all lie flat on a planar surface. As first and second outer brackets 12 and 16 are rotated relative to first and second inner brackets 14 and 18, and away from the flat surface, the various cam components 30-36 move relative to each other. FIGS. 8A-10B illustrate that relative movement.

Figure 8B:
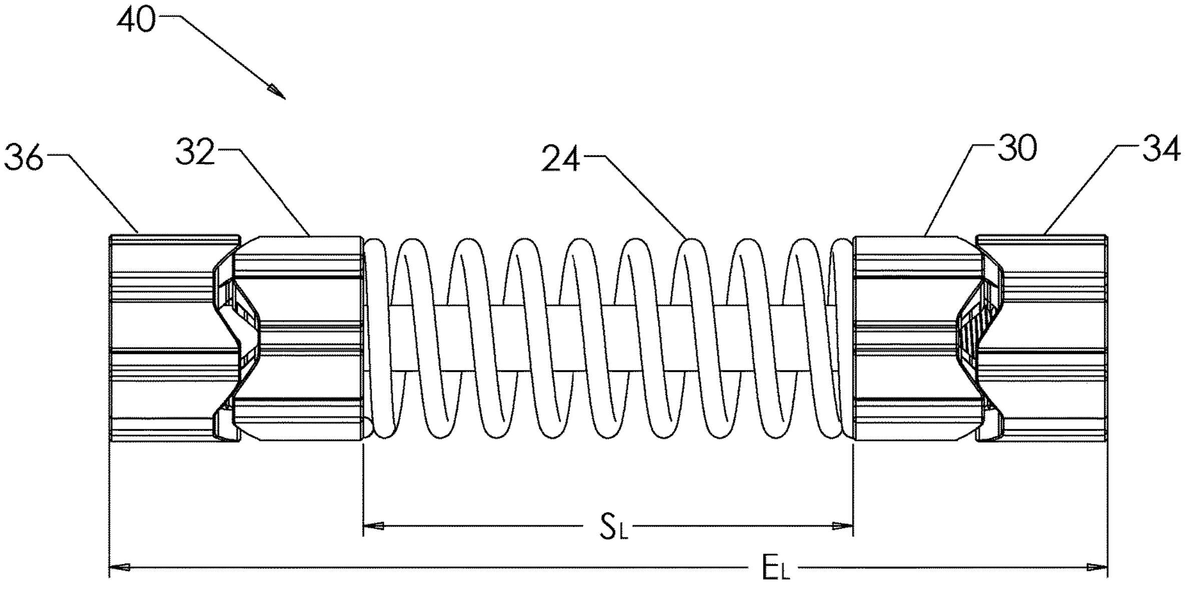
FIG. 8B illustrates a torque engine associated with the detent hinge device as positioned in FIG. 8A in accordance with one embodiment.

FIG. 8B illustrates torque engine 40, which is within detent hinge device 10 from FIG. 8A, such that it shows how the components of torque engine 40 move as the brackets rotate. In one embodiment, detent hinge device 10 is configured such that when first and second outer brackets 12 and 16 and first and second inner brackets 14 and 18 all lie flat on a surface, the cam faces are rotated out of alignment, such that first and second cam components 30 and 32 compress inward toward each other and against spring 24, as illustrated in FIG. 8B. This cam angle at the flat position is fully adjustable within the design of hinge 10 and as shown provides a hinge torque to drive the system into the flat position. Accordingly, the spring length SL of spring 24 is relatively shorter than it is when cam faces are aligned, as will be illustrated. In one embodiment the spring length SL of spring 24 is 37 mm. The overall engine length $E_L$ of torque engine 40 is set by adjusting the nut 22 on bolt 20. In one embodiment, the overall engine length $E_L$ of torque engine 40 is 76 mm. In one embodiment, the overall engine length $E_L$ of torque engine 40 does not change as first and second outer brackets 12 and 16 are rotated relative to first and second inner brackets 14 and 18. It is the same for each of FIGS. 8B, 9B and 10B.

Figure 9A:
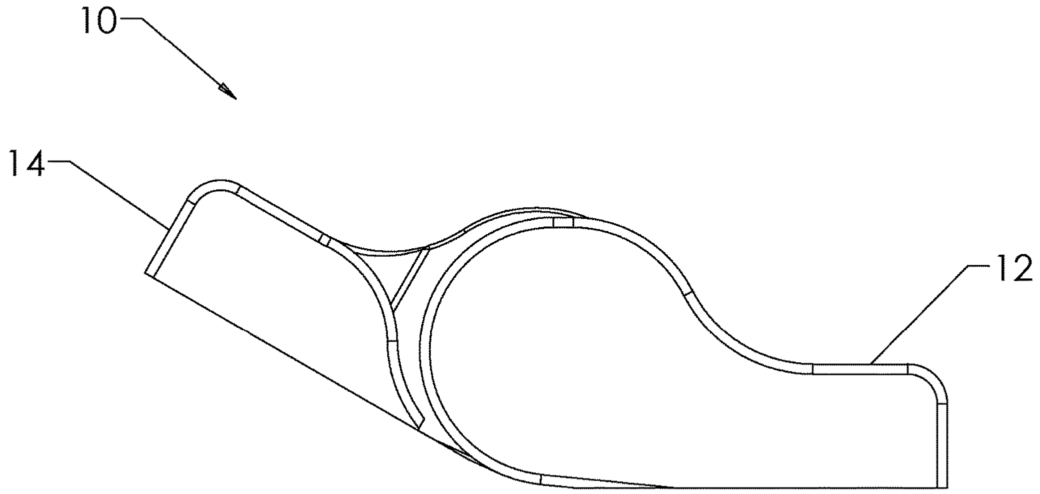
FIG. 9A illustrates a side view of a detent hinge device in a first rotated position in accordance with one embodiment.

FIG. 9A illustrates detent hinge device 10 in a slightly rotated position, in that the flange portions of first and second inner brackets 14 and 18 are rotated up from the flat position by about 30°, while first and second outer brackets 12 and 16 remain flat on a planar surface. As first and second outer brackets 12 and 16 are rotated relative to first and second inner brackets 14 and 18, and away from the flat surface, the various cam components 30-36 move relative to each other.

Figure 9B:
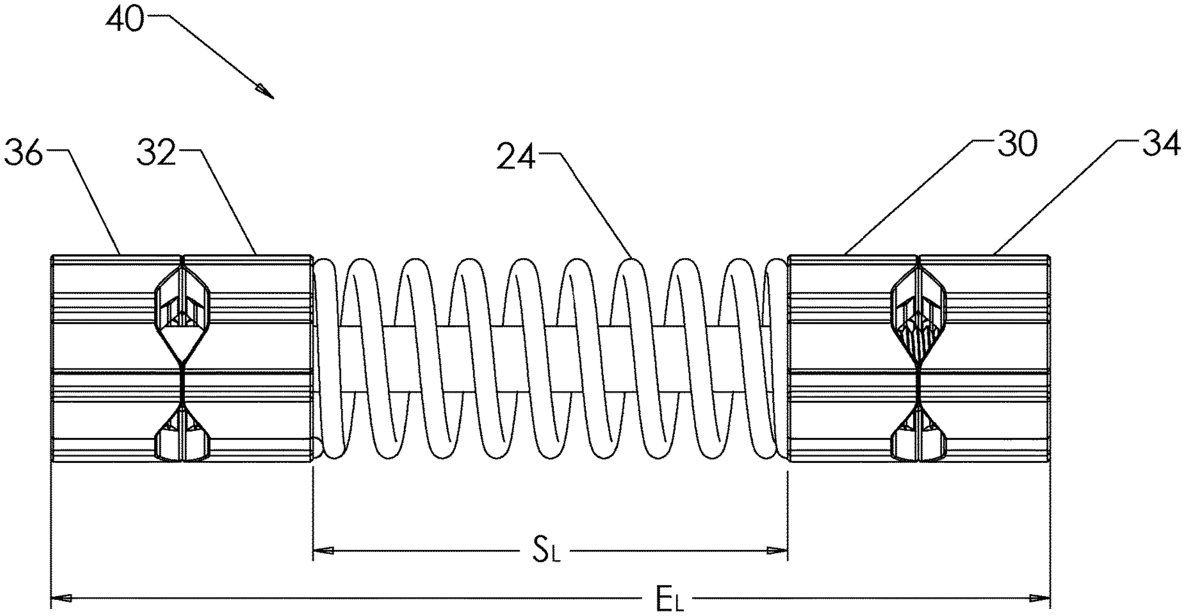
FIG. 9B illustrates a torque engine associated with the detent hinge device as positioned in FIG. 9A in accordance with one embodiment.

FIG. 9B illustrates torque engine 40, which is within detent hinge device 10 from FIG. 9A, such that it shows how the components of torque engine 40 move as the brackets rotate. In one embodiment, when first and second inner brackets 14 and 18 are rotated up from the flat position by about 30°, the cam faces are rotated further out of alignment so that maximum detent heights on the faces are aligned, such that first and second cam components 30 and 32 compress inward a maximum amount toward each other and against spring 24, as illustrated in FIG. 9B. In one embodiment the spring length SL of spring 24 in this position is 36 mm. In one embodiment, the overall engine length $E_L$ of torque engine 40 does not change.

Figure 10A:
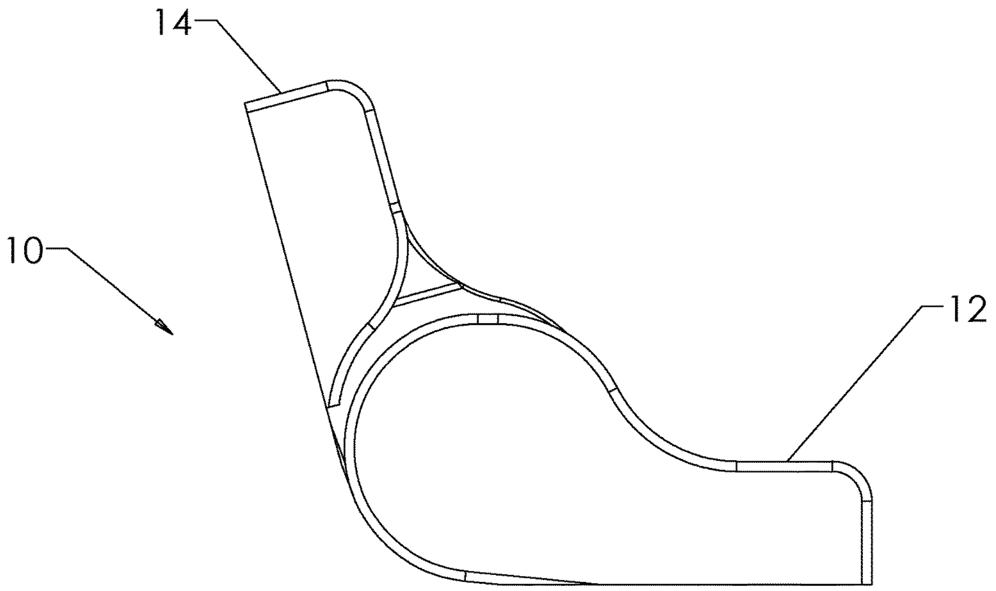
FIG. 10A illustrates a side view of a detent hinge device in a detent position in accordance with one embodiment.

FIG. 10A illustrates detent hinge device 10 in a more rotated position, in that the flange portions of first and second inner brackets 14 and 18 are rotated up from the flat position by about 75°, while first and second outer brackets 12 and 16 remain flat on a planar surface. As first and second outer brackets 12 and 16 are rotated relative to first and second inner brackets 14 and 18, and away from the flat surface, the various cam components 30-36 move relative to each other.

Figure 10B:
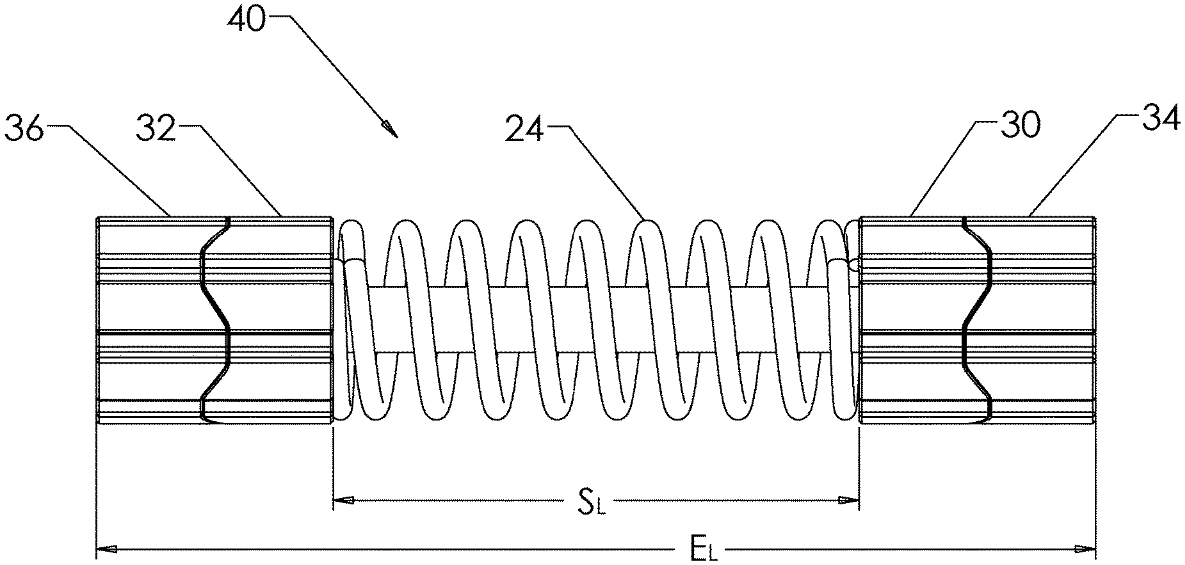
FIG. 10B illustrates a torque engine associated with the detent hinge device as positioned in FIG. 10A in accordance with one embodiment.

FIG. 10B illustrates torque engine 40, which is within detent hinge device 10 from FIG. 10A, such that it shows how the components of torque engine 40 move as the brackets rotate. In one embodiment, when first and second inner brackets 14 and 18 are rotated up from the flat position by about 75°, the cam faces are rotated into alignment so that are mated, such that first and second cam components 30 and 32 travel outward a maximum amount away from each other, as illustrated in FIG. 10B. In one embodiment the spring length SL of spring 24 in this position is 40 mm. In one embodiment, the overall engine length $E_L$ of torque engine 40 does not change.

The relative positions of torque engine 40 and brackets 12-18 can be adjusted and customized to suit any of a variety of applications. For example, detent hinge device 10 illustrated in FIGS. 8A-10B is configured to have its set detent home position at about 75° of relative rotation between inner brackets 14 and 18 and outer brackets 12 and 16. It may be advantageous to have the home position located there for certain applications. This can be readily adjusted to move the home position to any angular location to customize the application. In addition, the number of detent positions within the range of motion and the torque profile of the detent can be set within the specific features of the cam face design.

In detent hinges it is known in the art that the factors of cam outer diameter $D_O$, cam face profile, spring load and coefficient of friction determine the detent hinge torque. Also known detent hinge design parameters is the number of detent positions (where cams are at minimal length) within the cam face profile, this can be once per rotation or 20 or more times per rotation. The detent position relative to the system position can be selected to influence the system behavior during the hinge's opening and closing motion, affecting how it provides torque into specific positions.

The spring load is known to be controlled by the spring preload and the spring rate. The spring rate determines the stiffness of the spring attached to the hinge. A higher spring rate provides more resistance during cam movement, affecting the spring load when the cams are away from the detent positions. Spring preload refers to the force of the spring when the cams are in their detent position. It sets the baseline force needed to start moving the hinge. Adjusting the spring preload during detent hinge assembly can fine-tune the overall performance of the detent hinge, affecting its feel and functionality. Spring load can come from any number of known compliant members or "springs", including wound wire or machined compression springs, disc spring like Belleville or wave washers, urethane and other compliant materials. For example, although a helical compression spring is illustrated in detent hinge device 10, any number of springs, such as Belleville spring washers, wave washers, urethane and other compliant materials, can be used as well.

Collectively, these parameters play a role in designing a detent hinge that meets specific requirements for ease of use, secure locking positions, and overall functionality.

Although hinge brackets are illustrated in the prior embodiment, other configurations are also possible. For example, the brackets do not need to have flanges with screw holes. In one embodiment, a torque insert version is used where the bracket flanges are eliminated and drive tabs are used instead.

Figure 11:
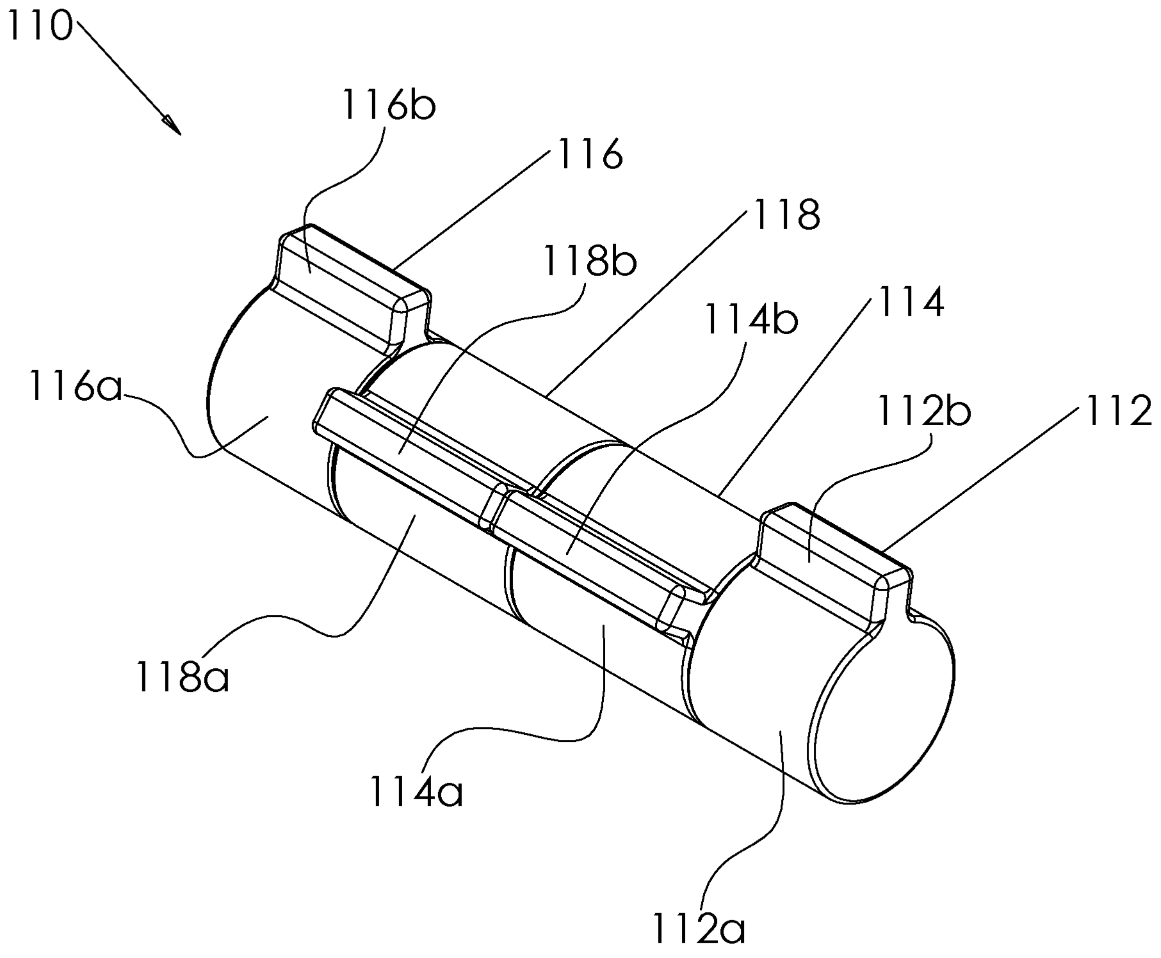
FIG. 11 illustrates a perspective view of a detent hinge device in accordance with one embodiment.

FIG. 11 illustrates such a torque insert embodiment in detent hinge device 110. In one embodiment, detent hinge device 110 includes first and second outer brackets 112 and 116, and first and second inner brackets 114 and 118. In one embodiment, brackets 112-118 are insert tabs that can be inserted into various bodies in order to hinge one body relative to another. In one embodiment, detent hinge device 110 incorporates a torque engine, such as torque engine 40 from FIGS. 4A-4B, with cam components having cam surfaces to enable smooth and controlled movement between detent positions, maximizing torque, minimizing wear, and improve the overall user experience.

Figure 12:
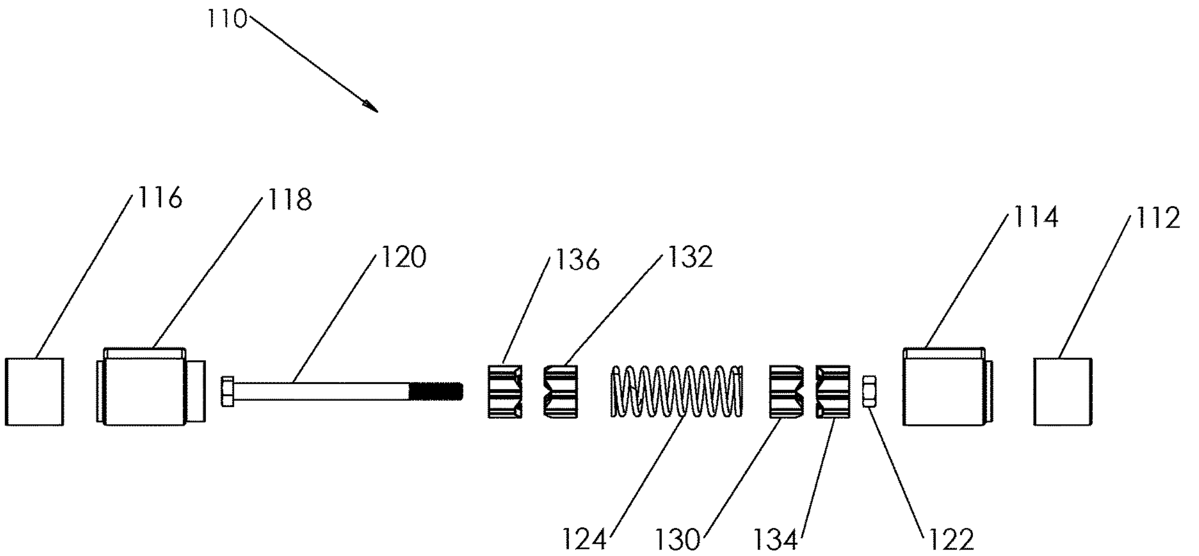
FIG. 12 illustrates an exploded view of the detent hinge device of FIG. 11 in accordance with one embodiment.

FIG. 12 illustrates and exploded view of detent hinge 110 in accordance with one embodiment. In this view, the various components of detent hinge device 110 are visible. In one embodiment, detent hinge device 110 includes first and second outer brackets 112 and 116, first and second inner brackets 114 and 118, bolt 120, nut 122, spring 124, first and second inner cam components 130 and 132, and first and second outer cam components 134 and 136. In one embodiment, first outer bracket 112 includes barrel portion 112*a* and drive tab portion 112*b*, second outer bracket 116 includes barrel portion 116*a* and drive tab portion 116*b*, first inner bracket 114 includes barrel portion 114*a* and drive tab portion 114*b*, and second inner bracket 118 includes barrel portion 118*a* and drive tab portion 118*b*. In one embodiment, bolt 120 includes bolt head 121.

In one embodiment, barrel portions 112*a*, 114*a*, 116*a*, and 118*a* each include drive features such as splines on their inner surface, which are separated by grooves, such as those previously illustrated in FIGS. 6A-7C and discussed above with respect to detent hinge 10. In one embodiment, barrel portion 112*a* of first outer bracket 112 is slid over the torque engine such that splines on the inner surface of barrel portion 112*a* mate with splines from first outer cam component 134, such that there is minimal relative rotation between them about bolt 120. Similarly, barrel portion 116*a* of second outer bracket 116 is slid over the torque engine such that splines on the inner surface of barrel portion 116*a* mate with splines from second outer cam component 136, such that there is minimal relative rotation between them about bolt 120. Similarly, barrel portion 114*a* of first inner bracket 114 is slid over the torque engine such that splines on the inner surface of barrel portion 114*a* mate with splines from first inner cam component 130, such that there is minimal relative rotation between them about bolt 120. Finally, barrel portion 118*a* of second inner bracket 118 is slid over the torque engine such that splines on the inner surface of barrel portion 118*a* mate with splines from second inner cam component 132, such that there is minimal relative rotation between them about bolt 120.

Figure 13A:
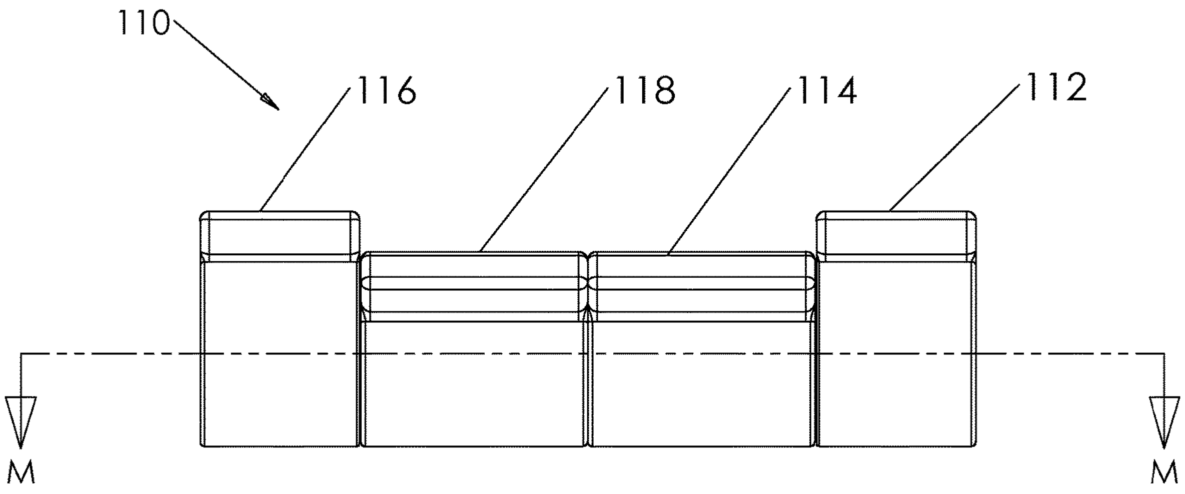
FIG. 13A illustrates a side view of the detent hinge device of FIG. 11 in accordance with one embodiment.
Figure 13B:
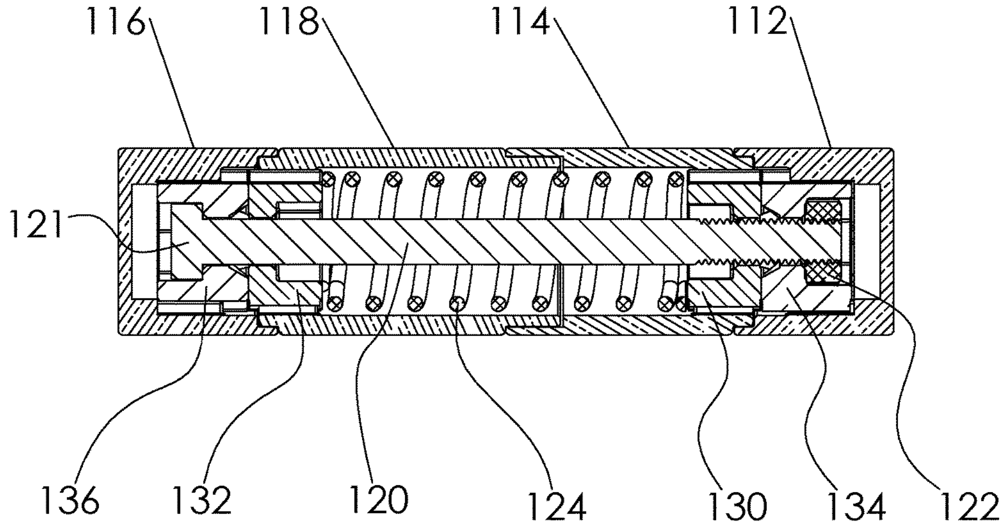
FIG. 13B illustrates a sectional view of the detent hinge device of FIG. 13A taken at line M-M in accordance with one embodiment.

FIG. 13A illustrates detent hinge device 110 viewed from the back, and includes reference line M-M. FIG. 13B illustrates a sectional view of detent hinge device 110 taken at line M-M in accordance with one embodiment. In one embodiment, when assembled detent hinge device 110 includes first and second inner cam components 130 and 132 coupled respectively within the barrel portions of first and second inner brackets 114 and 118. In addition, first and second outer cam components 134 and 136 are coupled respectively within the barrel portions of first and second outer brackets 112 and 116. In one embodiment, each of cam components 130-136 have a center hole through which bolt 120 extends. Furthermore, spring 124 is secured over bolt 120 and between first inner cam component 130 and second inner cam component 132. Bolt 120 includes a bolt head 121 on one end and nut 122 is secured to threads at the other end. In this way, bolt 120 secures cam components 130-136 and spring 124 axially.

Similar to cam components 30-36 discussed above and illustrated in FIG. 5A-5C, cam components 130-136 include cam faces, and the cam faces of first inner and outer cam components 130 and 134 are oriented toward each other, and the cam faces of second inner and outer cam components 132 and 136 are oriented toward each other. In one embodiment, spring 124 is a compression spring that acts on first inner cam component 130 and second inner cam component 132 keeping them respectively forced outward and against outer cam components 134 and 136. In one embodiment, outer cam components 134 and 136 are prevented from outward axial movement by bolt head 121 and nut 122.

In one embodiment, inner brackets 114 and 118 are inserted within a first hinged element and outer brackets 112 and 116 are inserted within a second hinged element. Drive tab portions 114*b* and 118*b* engage the first hinged element such that inner brackets 114 and 118 are relatively fixed thereto. Similarly, drive tab portions 112*b* and 116*b* engage the second hinged element such that outer brackets 112 and 116 are relatively fixed thereto.

In operation, when inner brackets 114 and 118 are rotated relative to outer brackets 112 and 116 about shaft 120, outer cam components 134 and 136 stay fixed relative to outer brackets 112 and 116, transmitting torque through a spline interface (as explained above detent hinge device 10) to outer brackets 112 and 116. Meanwhile, inner cam components 130 and 132 travel axially, compressing spring 124 and sliding in splines of the barrel portion of the inner brackets 114 and 116, and transmit torque to the inner brackets 114 and 116.

In one embodiment, detent hinge device 110 provides symmetric torque and provides the same torque profile in both directions of relative rotation of inner and outer drive tabs 112, 114, 116, 118. In one embodiment, all of first and second inner cam components 130 and 132, and second outer cam components 134 and 136 are identical parts, they are all shaped the same. Using identical parts for each of inner and outer cam components 130, 132, 134 and 136 eliminates the risk of assembling the wrong cams in the wrong places. Furthermore, there is significant improved cost in needing only a single part to function in 4 different locations of detent hinge device 110, lower tooling and inventory cost.

Figure 14:
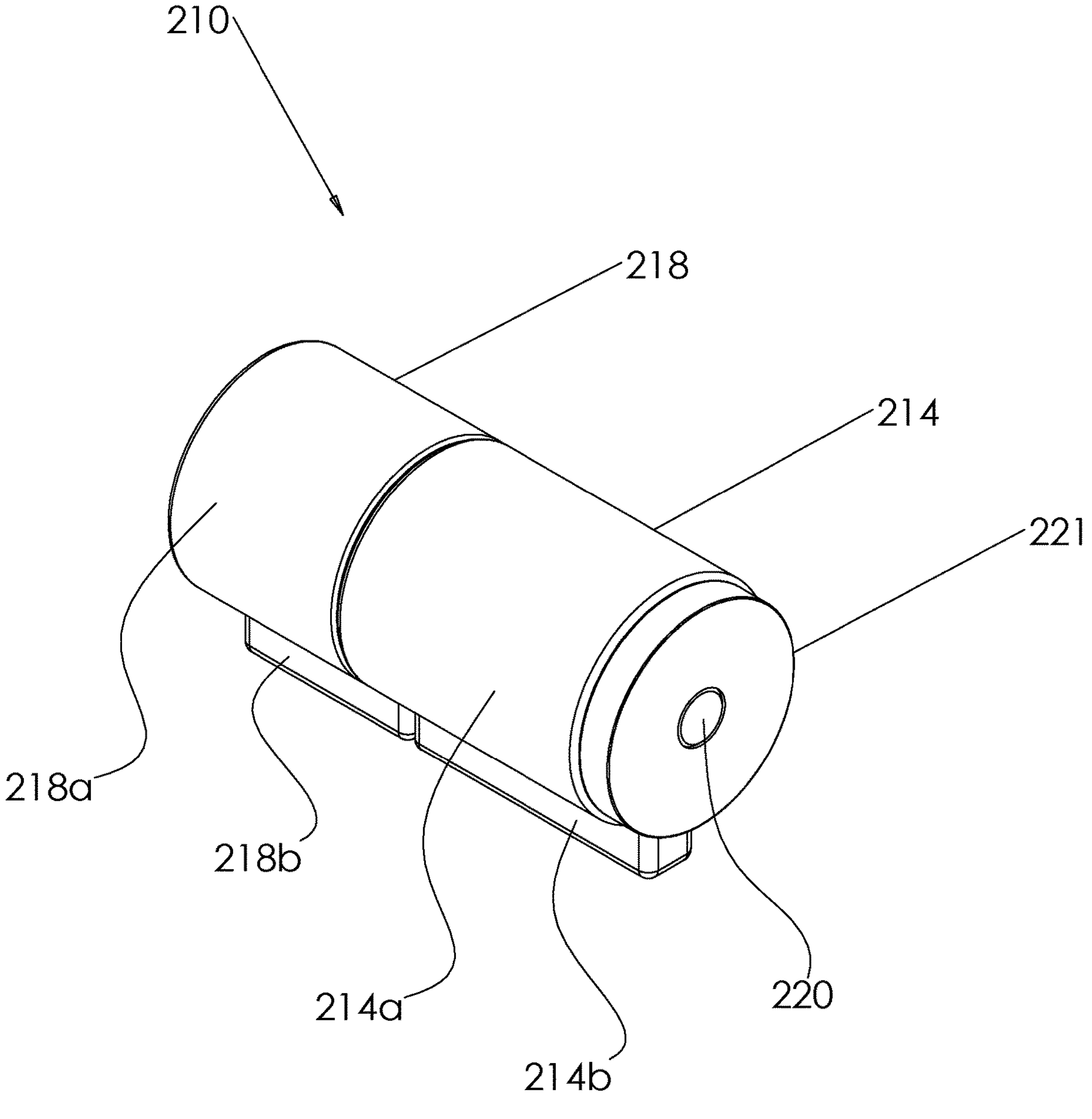
FIG. 14 illustrates a perspective view of a detent hinge device in accordance with one embodiment.

Although detent hinge devices 10 and 110 both illustrate double-ended embodiments, where two pairs of opposing cams are used on either side of a spring, single-ended embodiments are also possible. FIG. 14 illustrates such a single-ended embodiment in detent hinge device 210. In one embodiment, detent hinge device 210 includes first and second brackets 214 and 218. Brackets 214 and 218 can be inserted into various bodies in order to hinge one body relative to another. In one embodiment, detent hinge device 210 incorporates a torque engine, such as one half of the torque engine 40 from FIGS. 4A-4B, with cam components having cam surfaces to enable smooth and controlled movement between detent positions, maximizing torque, minimizing wear, and improve the overall user experience.

Figure 15:
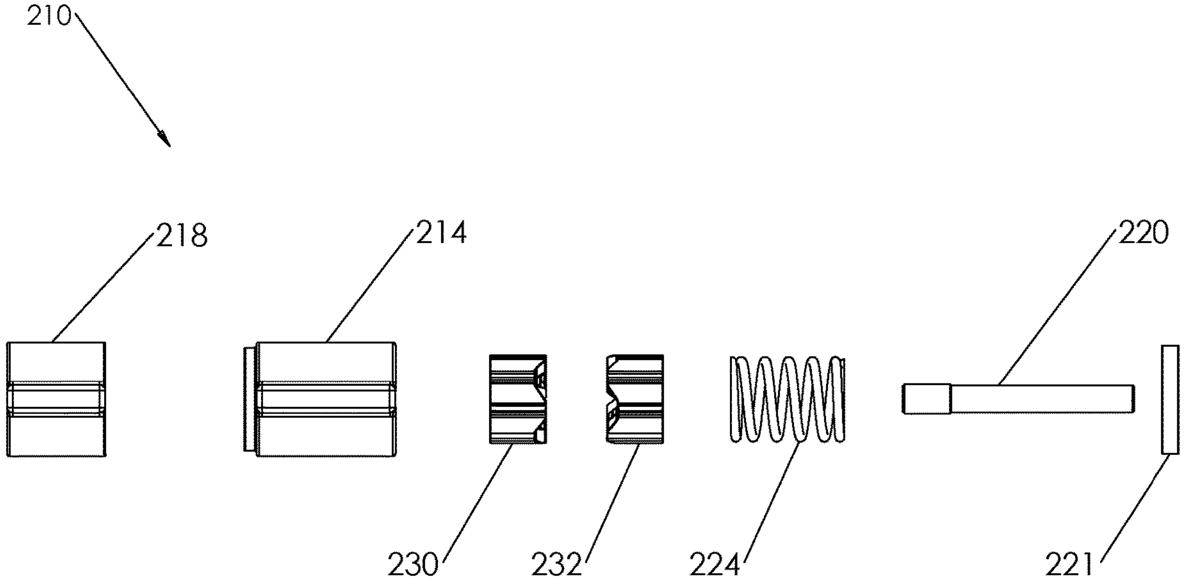
FIG. 15 illustrates an exploded view of the detent hinge device of FIG. 14 in accordance with one embodiment.

FIG. 15 illustrates and exploded view of detent hinge 210 in accordance with one embodiment. In this view, the various components of detent hinge device 210 are visible. In one embodiment, detent hinge device 210 includes first and second brackets 214 and 218, shaft 220, end cap 221, spring 224, and first and second cam components 230 and 232. In one embodiment, first bracket 214 includes barrel portion 214*a* and drive tab portion 214*b*, and second inner bracket 218 includes barrel portion 218*a* and drive tab portion 218*b*.

In one embodiment, barrel portions 214*a* and 218*a* each include drive features such as splines on their inner surface, which are separated by grooves, such as those previously illustrated in FIGS. 6A-7C and described above with respect to detent hinge 10. In one embodiment, barrel portion 214*a* of first bracket 214 is slid over the torque engine such that splines on the inner surface of barrel portion 214*a* mate with splines from second cam component 232, such that there is minimal relative rotation between them about shaft 220. Similarly, barrel portion 218*a* of second bracket 218 is slid over the torque engine such that splines on the inner surface of barrel portion 218*a* mate with splines from first cam component 230, such that there is minimal relative rotation between them about shaft 220.

Figure 16A:
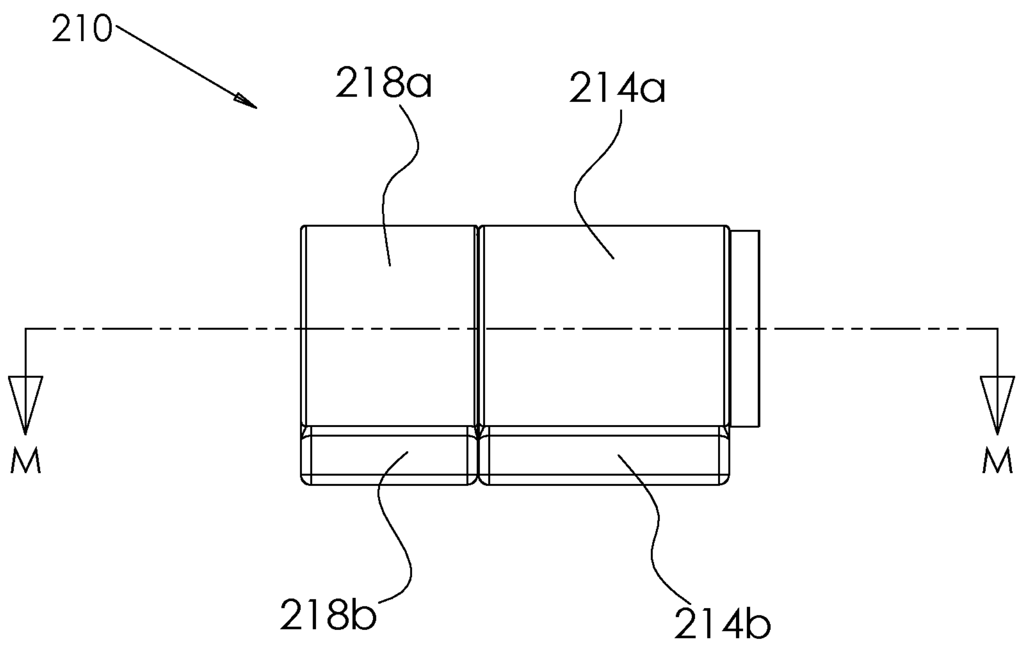
FIG. 16A illustrates a side view of the detent hinge device of FIG. 14 in accordance with one embodiment.
Figure 16B:
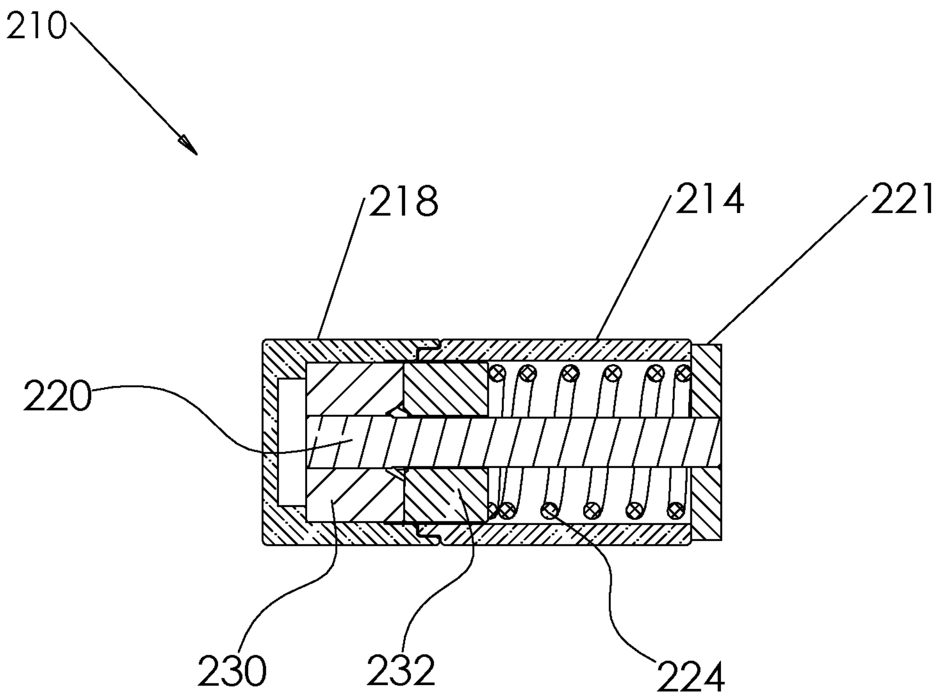
FIG. 16B illustrates a sectional view of the detent hinge device of FIG. 16A taken at line M-M in accordance with one embodiment.

FIG. 16A illustrates detent hinge device 210 viewed from the back, and includes reference line M-M. FIG. 16B illustrates a sectional view of detent hinge device 210 taken at line M-M in accordance with one embodiment. In one embodiment, when assembled detent hinge device 210 includes first and second cam components 230 and 232 coupled respectively within the barrel portions of second and first brackets 218 and 214. In one embodiment, each of cam components 230 and 232 have a center hole through which shaft 220 extends. Furthermore, spring 224 is secured over shaft 220. In one embodiment, end cap 221 is fixed over shaft 220 on one end, while the other end of shaft 220 is fixed to second cam component 232 axially securing spring 224 between end cap 221 and second cam component 232. The connection of shaft 220 is shown in this embodiment as a press fit, but could also be joined with many other connection methods known within the art such as: riveting, welding, retaining rings, threading and others.

Similar to cam components 30-36 discussed above and illustrated in FIG. 5A-5C, cam components 230 and 232 include cam faces, and the cam faces are oriented toward each other. In one embodiment, spring 224 is a compression spring that acts on first cam component 230 keeping it forced against second cam component 232. In one embodiment, first cam component 230 is prevented from axial movement by second bracket 218.

In operation, when first and second brackets 214 and 218 are rotated relative to each other, first cam component 230 stays fixed to second bracket 218 and second cam component 232 stays fixed to first bracket 214, transmitting torque through a spline or other drive feature interface (as explained above detent hinge device 10) to outer brackets 214 and 218. Meanwhile, second cam component 232 travels axially, compressing spring 224 and sliding in splines of the barrel portion of the first bracket 214 and transmitting torque to the first bracket 214.

In one embodiment, detent hinge device 210 provides symmetric torque and provides the same torque profile in both directions of relative rotation of brackets 214 and 218. In one embodiment, each of first and second cam components 230 and 232 are common parts, they are all shaped the same. Using common/identical parts for each eliminates the risk of assembling the wrong cams in the wrong places. Furthermore, there is significant improved cost in needing only a single part to function in two different locations of detent hinge device 210, lower tooling and inventory cost.

Figure 17A:
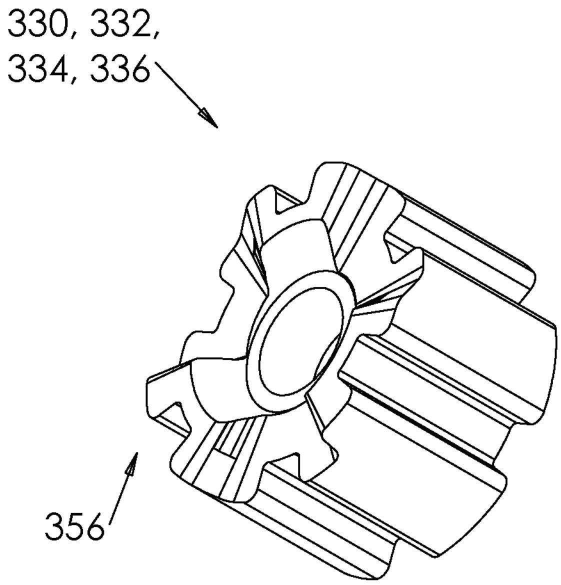
FIGS. 17A-17B illustrate a cam component for a detent hinge device in accordance with one embodiment.
Figure 17B:
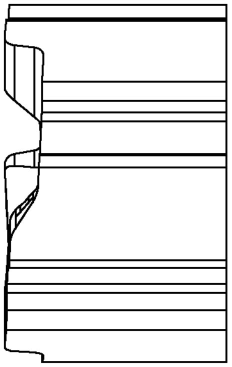

Although each of detent hinge devices 10, 110, and 210 described provide symmetric torque, each can also be configured to provide asymmetrical torque as well. FIGS. 17A and 17B illustrate cam component 330, which when used in detent hinge devices, such as detent hinge devices 10, 110, and 210, provide asymmetrical torque in accordance with one embodiment.

Figure 19A:
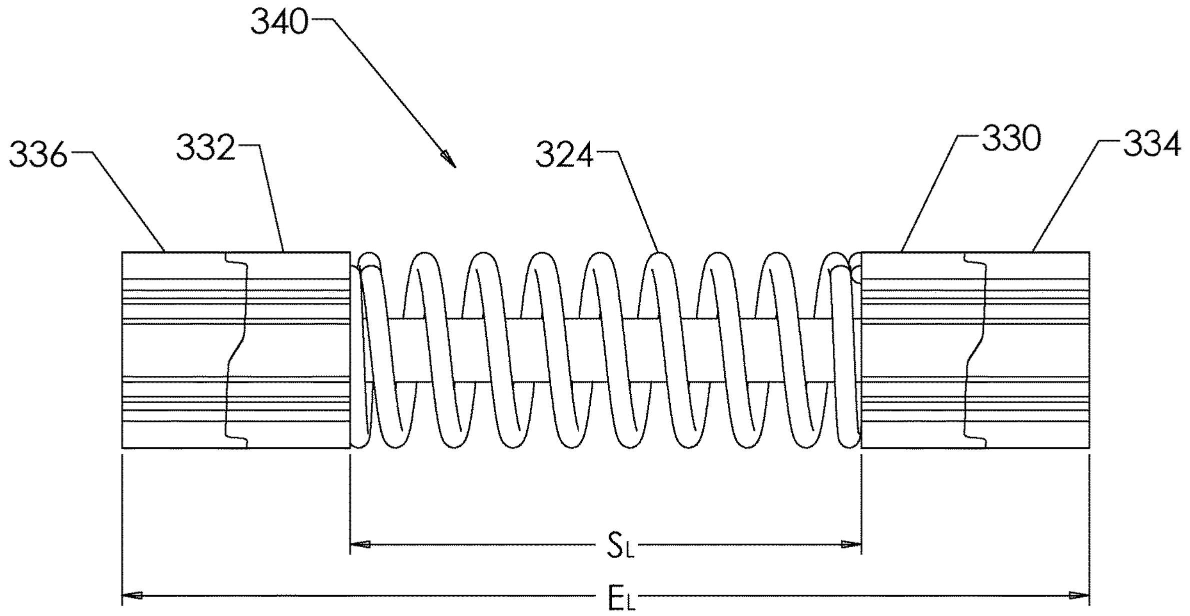
FIGS. 19A-19B illustrate side views of a torque engine for a detent hinge device in two respective rotational positions in accordance with one embodiment.
Figure 19B:
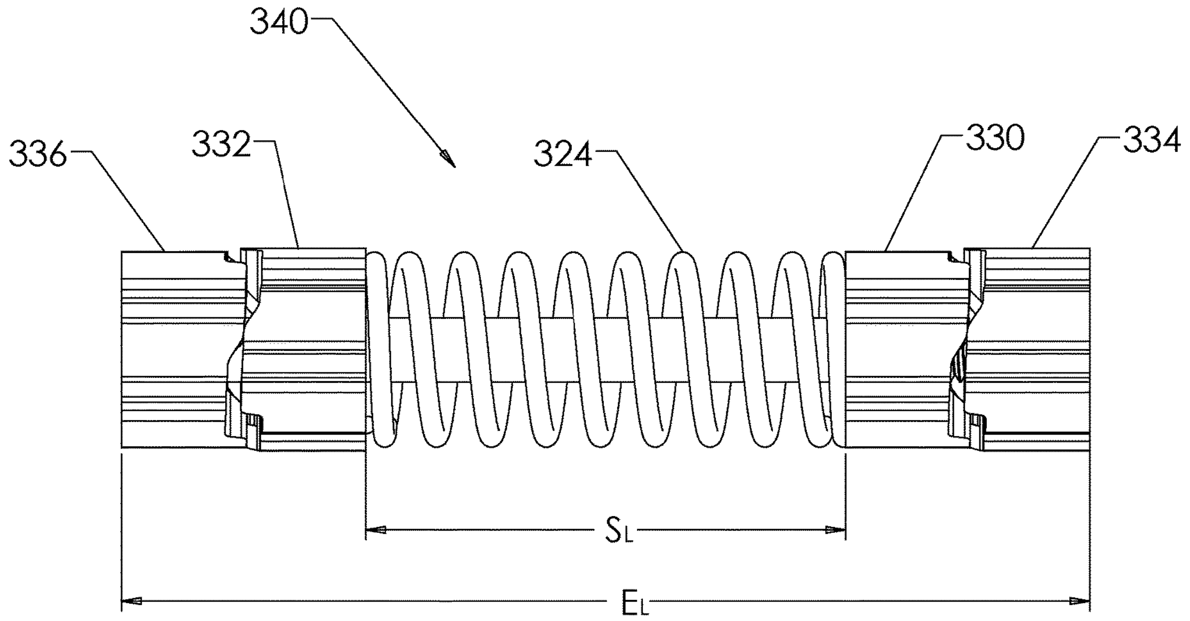

In one embodiment, the same cam component 330, 332, 334, 336 can be used four places of the torque engine to provide asymmetric torque. FIGS. 19A-19B illustrate side views of such a torque engine 340 for a detent hinge device in two respective rotational positions in accordance with one embodiment. In this embodiment, first and second inner cam components 330 and 332 are located on either side of spring 324, and first and second outer cam components 334 and 336 are adjacent the inner cams. Torque engine 340 can be axially contained similarly to that described above for torque engine 40 and secured within brackets as described above. Cam component 330, 332, 334, 336 has a face 356, which is shaped to provide asymmetric torque upon relative rotation of two opposing faces 356.

In one embodiment of asymmetric torque engine 340, the inner cam component 330 must turn or stay stationary with the outer cam component 336, while inner cam component 332 must turn or stay stationary with outer cam component 334. With this dynamic, spring 324 will twist and may shift during compression and extension during relative rotation. When secured with a threaded connection the nut will also move on the bolt during this rotational motion. The nut is still constrained from losing position on successive cycles and can be caused to tighten as the hinge is closed and open as the hinge is opened for storing additional energy in the closed position or conversely, if there is a desire for a higher spring compression in the upper detent position the bolt threads can be used to create the higher spring forces in the upper detent position. This is achieved by configuring the outer brackets to rotate left-handed or right-handed as the hinge is moved.

A further advantage of this asymmetric torque design is that only two bracket types are required. These brackets could be used with a torque engine made with four of the symmetric cams as well.

Figure 18A:
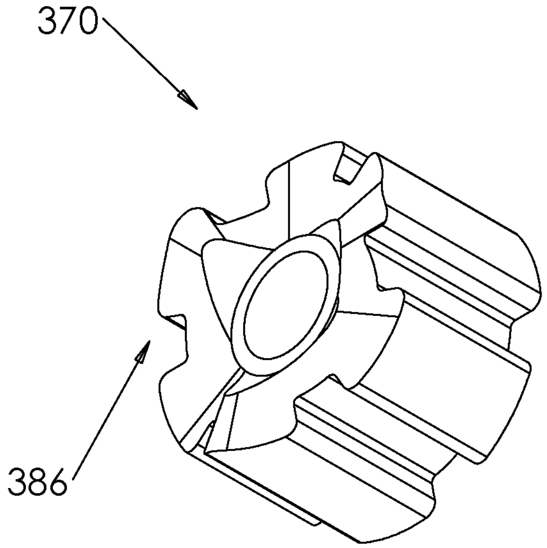
FIGS. 18A-18B illustrate a cam component for a detent hinge device in accordance with one embodiment.
Figure 18B:
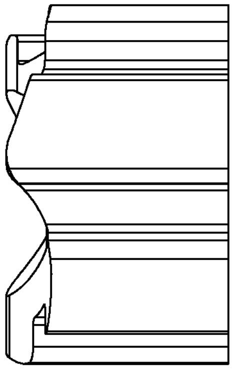

In addition to providing symmetric and asymmetric torque profiles, cam face surfaces can vary and provide any of a range of user experiences. FIGS. 18A-18B illustrate a cam component 370 for a detent hinge device in accordance with one embodiment. In one embodiment, cam component 370 has a cam face 386, which includes a similar asymmetric torque engine to can component 330 of FIG. 17A/B, and can be made with an asymmetric sine function cam face 386 to provide a stable holding force for a horizontally hinged bin lid in most locations. Near closed and the opened detent position the sine function surface can be modified to give a preferred end of travel user experience. In the down position, the torque could be used to hold the lid closed to eliminate popup and objectionable noises. In the up detent position the lid could be held within a range of position with friction torque or enter into a detent for locating in a specific position.

Figure 20:
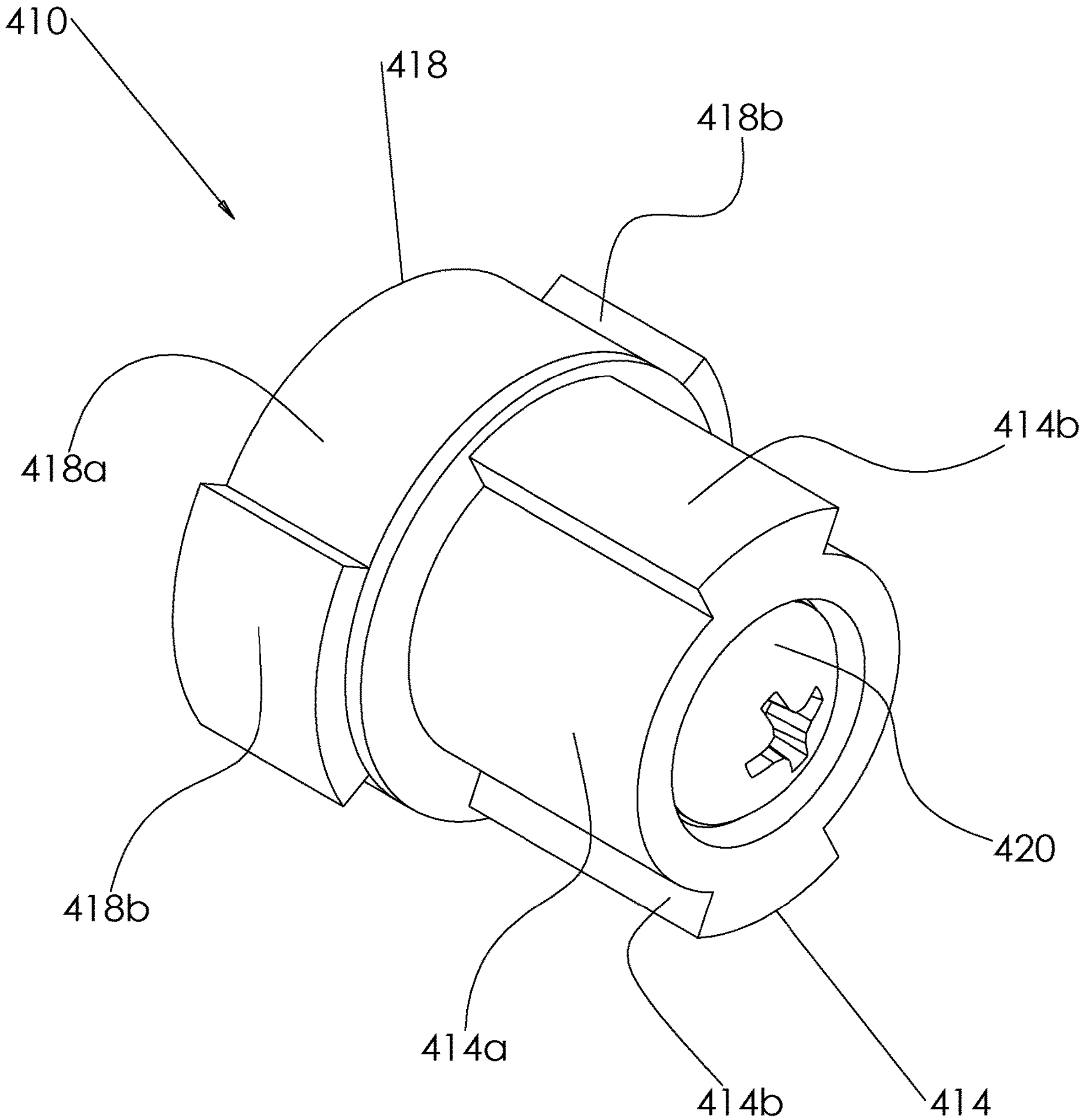
FIG. 20 illustrates a perspective view of a detent hinge device in accordance with one embodiment.

FIG. 20 illustrates a single-ended embodiment detent hinge device 410. In one embodiment, detent hinge device 410 includes first and second brackets 414 and 418. Brackets 414 and 418 can be inserted into various bodies in order to hinge one body relative to another. In one embodiment, detent hinge device 410 incorporates a torque engine, such as one half of the torque engine 40 from FIGS. 4A-4B, with cam components having cam surfaces to enable smooth and controlled movement between detent positions, maximizing torque, minimizing wear, and improve the overall user experience.

Figure 21:
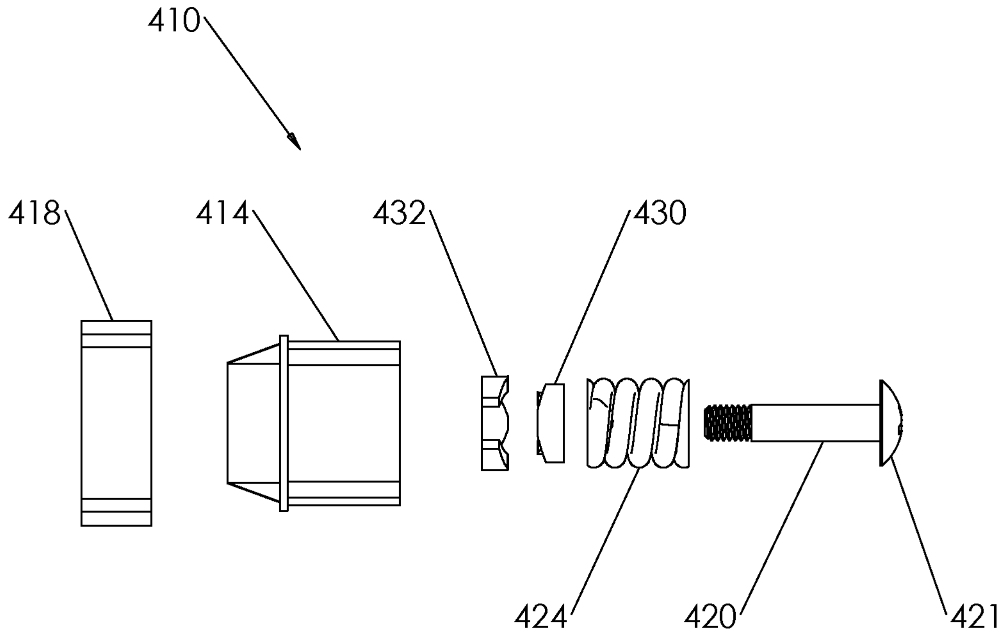
FIG. 21 illustrates an exploded view of the detent hinge device of FIG. 20 in accordance with one embodiment.

FIG. 21 illustrates and exploded view of detent hinge 410 in accordance with one embodiment. In this view, the various components of detent hinge device 410 are visible. In one embodiment, detent hinge device 410 includes first and second brackets 414 and 418, bolt 420 with bolt head 421, spring 424, and first and second cam components 430 and 432. In one embodiment, first bracket 414 includes barrel portion 414*a* and first and second and drive tab portions 414*b*, and second bracket 418 includes barrel portion 418*a* and first and second drive tab portions 418*b*.

In one embodiment, first bracket 414 is inserted within a first hinged element and second bracket 418 is inserted within a second hinged element. First and second drive tab portions 414*b* engage the first hinged element such that first bracket 414 is relatively fixed thereto. Similarly, first and second drive tab portions 418*b* engage the second hinged element such that second bracket 418 is relatively fixed thereto.

Figure 22A:
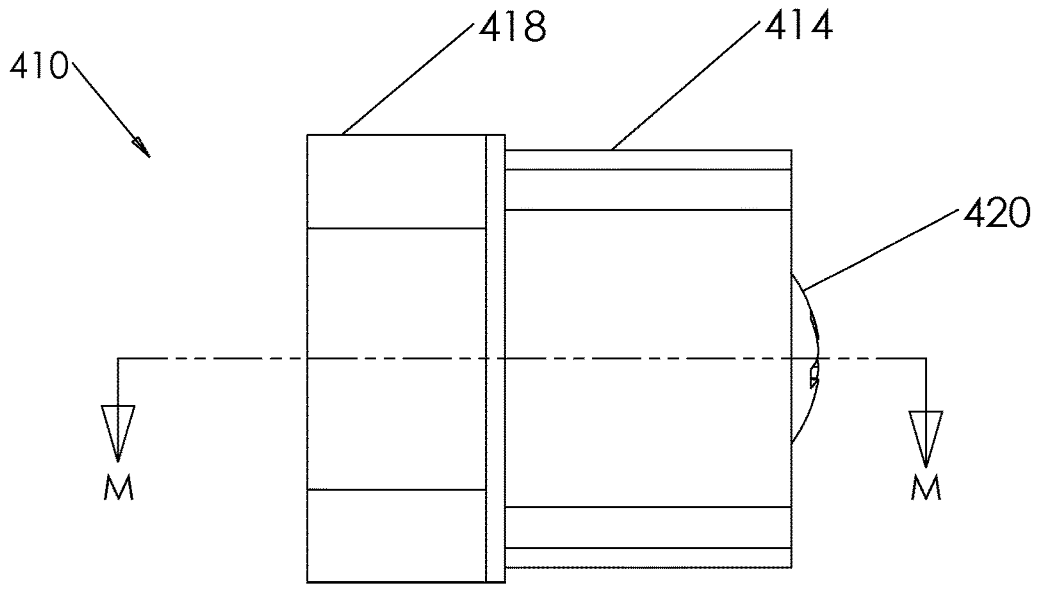
FIG. 22A illustrates a side view of a detent hinge device in accordance with one embodiment.
Figure 22B:
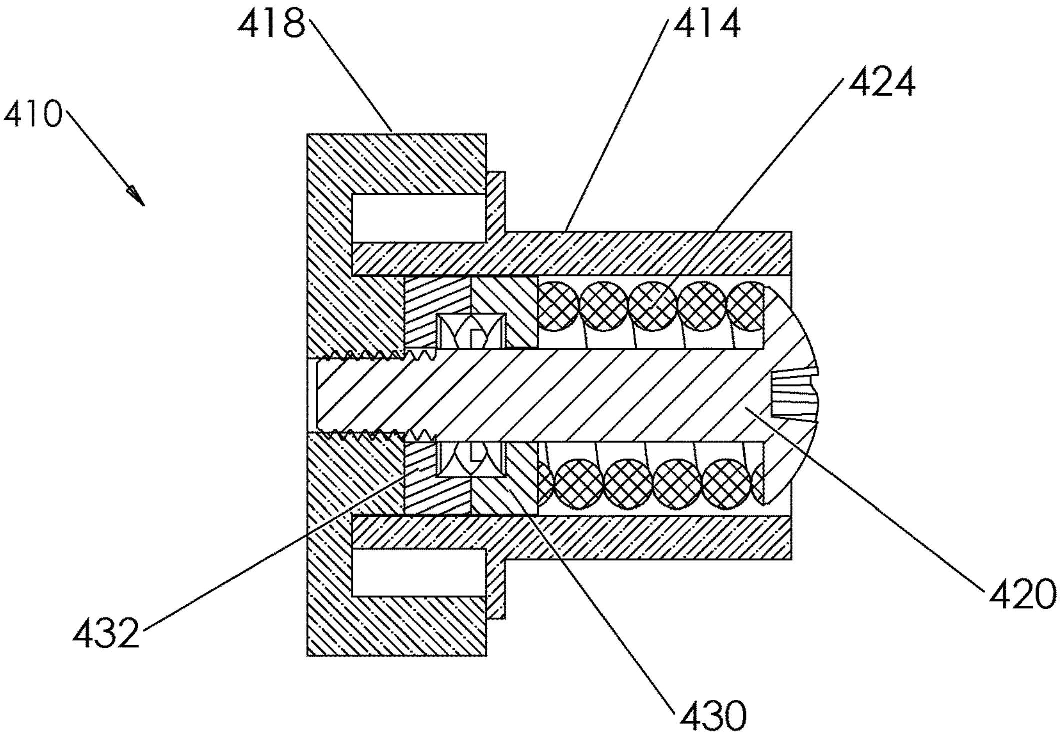
FIG. 22B illustrates a sectional view of the detent hinge device of FIG. 22A taken at line M-M in accordance with one embodiment.

FIG. 22A illustrates detent hinge device 410, and includes reference line M-M. FIG. 22B illustrates a sectional view of detent hinge device 410 taken at line M-M in FIG. 22A in accordance with one embodiment. In one embodiment, when assembled detent hinge device 410 includes first and second cam components 430 and 432 coupled respectively within first and second brackets 414 and 418. In one embodiment, each of cam components 430 and 432 have a center hole through which bolt 420 extends. Furthermore, spring 424 is secured over bolt 420 and between first cam component 430 and bolt head 421. Bolt 420 includes a bolt head 421 on one end and is threaded in one embodiment such that it can be screwed into second bracket 418 at the other end. In this way, bolt 420 secures cam components 430 and 432 and spring 424 axially.

As will be further discussed below, each of first and second cam components 430 and 432 include cam faces. The cam faces of first and second cam components 430 and 432 are oriented toward each other. In one embodiment, spring 424 is a compression spring that acts on first cam component 430, keeping it forced toward and against second cam component 432.

In operation, when first and second brackets 414 and 418 are rotated relative to each other, second cam component 432 stays fixed relative to second bracket 418, transmitting torque through a drive feature (further discussed below) to second bracket 418. Meanwhile, first cam components 430 travels axially, compressing spring 424 and sliding in the bracket splines, and transmits torque to the first bracket 414 through a drive feature.

In one embodiment, detent hinge device 410 provides symmetric torque and provides the same torque profile in both directions of relative rotation of first and second brackets 414 and 418 over 180 degrees of relative rotation. In one embodiment, both of first and second cam components 430 and 432 are common/identical parts, they are all shaped the same and are manufactured the same way. For example, when cam components are formed from powered metal, metal powder is compacted into a die and then sintered. Because all cam components are shaped the same, identically shaped dies are used for all components. Using identical parts for each of cam components 430 and 432 significantly improves cost in needing only a single part to function in two different locations of detent hinge device 410. It also lowers tooling and inventory cost. Furthermore, it eliminates the risk of assembling the wrong cams in the wrong places.

Figure 25A:
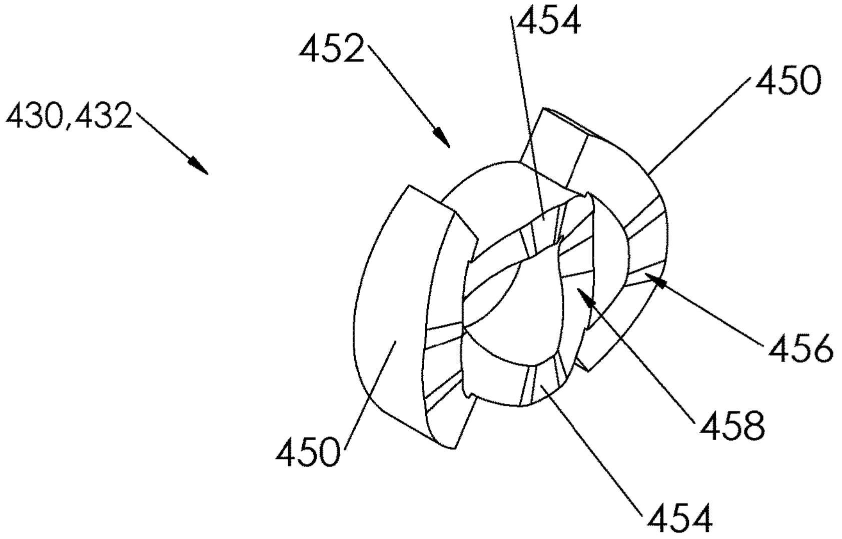
FIGS. 25A-25C illustrate a cam component for a detent hinge device in accordance with one embodiment.
Figure 25B:
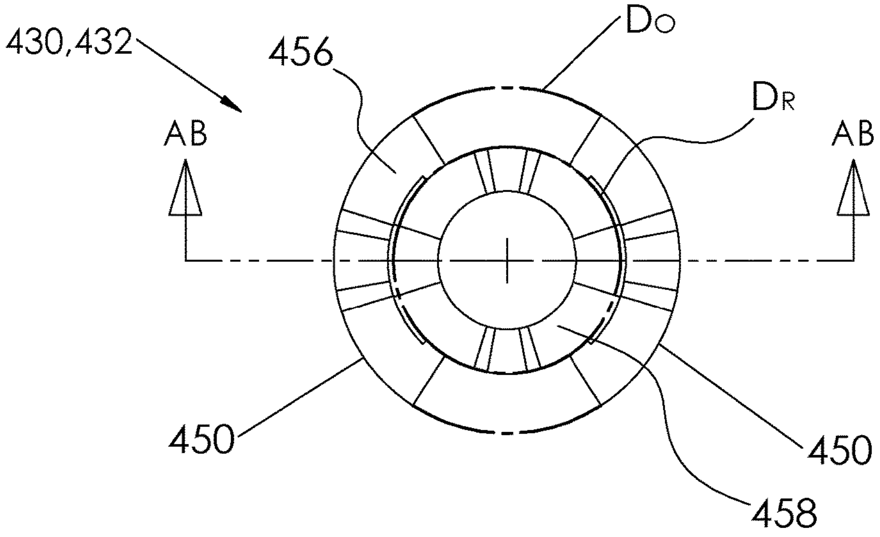
Figure 25C:
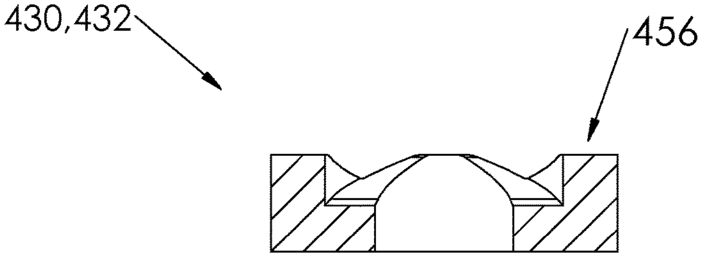

FIGS. 25A-25C illustrate first and second cam components 430 and 432 for detent hinge device 410 in accordance with one embodiment. In one embodiment, each of first and second cam components 430 and 432 are common/identical, so only one part is illustrated in the figures since it describes both components. In one embodiment, first and second cam components 430 and 432 include two drive features or splines 450 separated by grooves 452 on their outer periphery. As previously noted, other drive features are also known to function within the design. In one embodiment, first and second cam components 430 and 432 include cam face 456, which have ramped portions projecting out from face 456 and other ramped portions that retract into face 456.

As illustrated in FIG. 25C, first and second cam components 430 and 432 include a root diameter $D_R$ and an outer diameter $D_O$. As illustrated, splines 450 extend radially outward from the root diameter $D_R$ to the outer diameter $D_O$. Grooves 452 separate the two splines 450. In one embodiment, first and second cam components 430 and 432, in addition to cam face 456 on splines 450 also include inner cam face 458 within the root diameter $D_R$. Inner cam face 458 includes ramp feature 454, which prevents cam components 430 and 432 from tilting off the axis of bolt 420 during their relative rotation.

Splines 450, located between the root diameter $D_R$ and an outer diameter $D_O$, are the drive transfer portion of first and second cam components 430 and 432. When cam components 430 and 432 engage complementary splines in brackets 414 and 418, relative rotation of the brackets drives the splines 450 of cam components 430 and 432, thereby transmitting torque through a spline interface with the brackets.

In one embodiment, the outer diameter $D_O$ of spring 424 is larger than the root diameter $D_R$ of cam components 430 and 432. In one embodiment, the outer diameter $D_O$ of spring 424 is approximately the same as the outer diameter $D_O$ of cam components 430 and 432. As such, spring 424 presses on the splines 450, which occupy the radial area around the perimeter of cam components 430 and 432 between the root diameter $D_R$ and an outer diameter $D_O$. This allows more volume for spring 424, larger wire and higher spring forces within a given detent hinge barrel size, giving higher torque density. Splines on inner brackets provide clearance for the spring ends throughout the linear cam motion. Accordingly, detent hinge device 10 provides higher torque density, reduced package size, and improved cost.

Figure 24A:
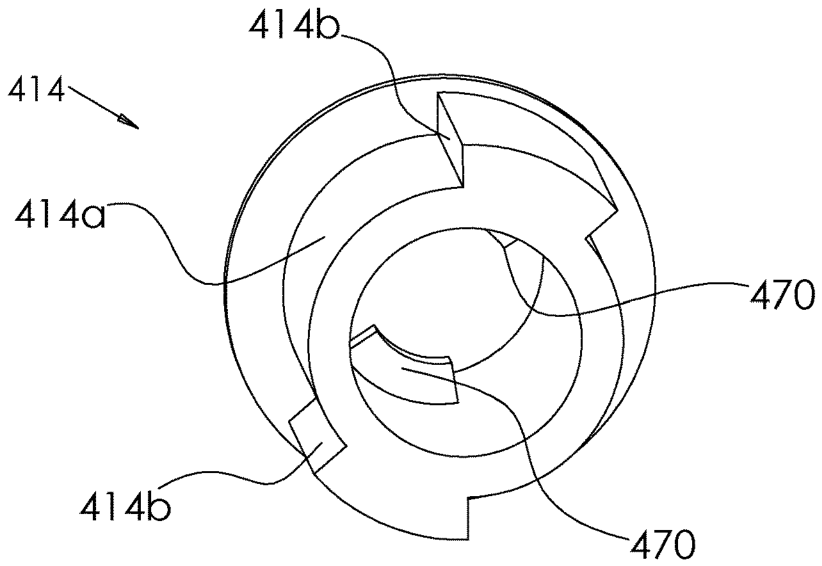
FIGS. 24A-24C illustrate a sliding cam bracket for a detent hinge device in accordance with one embodiment.
Figure 24B:
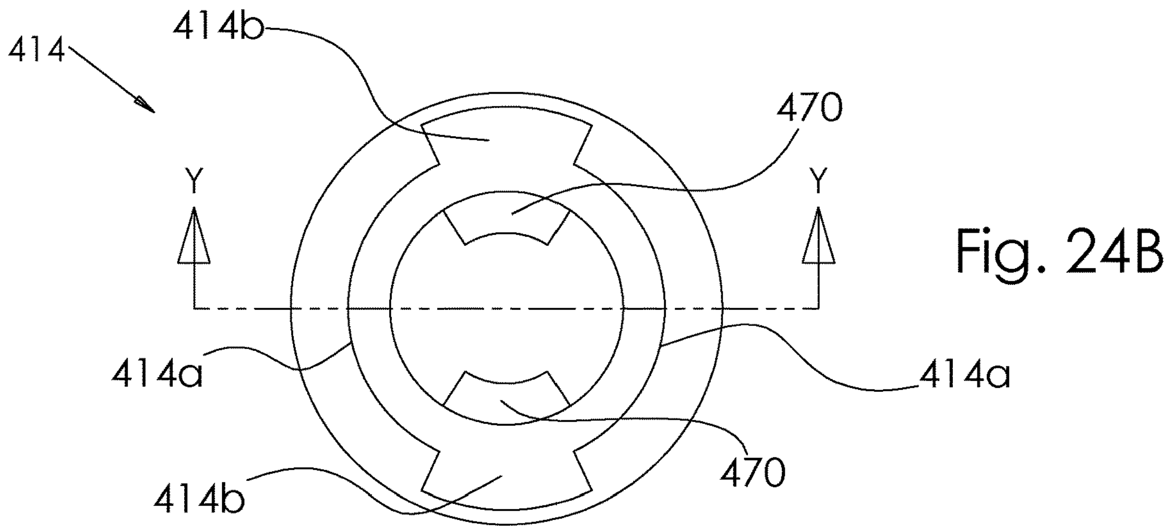
Figure 24C:
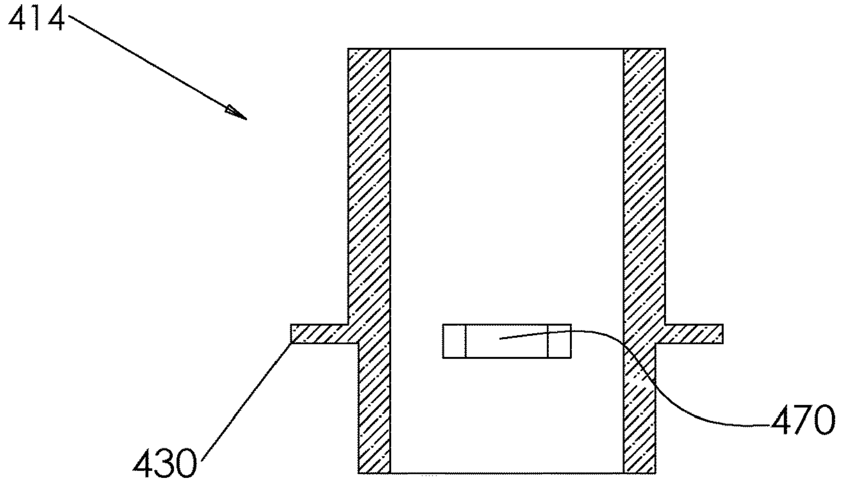

FIGS. 24A-24C illustrate first inner bracket 414 for detent hinge device 410 in accordance with one embodiment. In one embodiment, first bracket 414 includes barrel portion 414*a* and drive tab portions 414*b*. In the illustration, two drive tab portions 414*b* are shown for detent hinge device 410 to an application, such as by inserting first bracket 414 in an opening in a first hinged element that has a matching profile. Drive tabs 414*b* are readily designed in any of a variety of ways to couple detent hinge device 410 to applications where it is desired to rotate one body relative to another.

In one embodiment, barrel portion 414*a* includes two drive features such as splines 470 on its inner surface, which are separated by grooves 472. In one embodiment, barrel portion 414*a* of first bracket 414 is slid over first cam component 430 such that splines 470 mate with splines 450 from first cam component 430. The splines 450/470 and grooves 452/472 of first bracket 414 and first cam component 430 respectively mate such that there is minimal relative rotation between them about bolt 420.

Figure 23A:
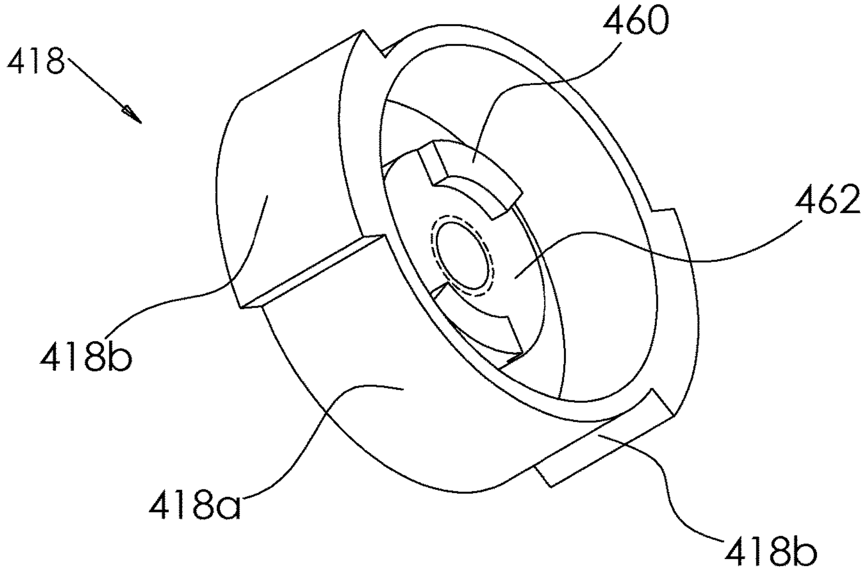
FIGS. 23A-23C illustrate a fixed cam bracket for a detent hinge device in accordance with one embodiment.
Figure 23B:
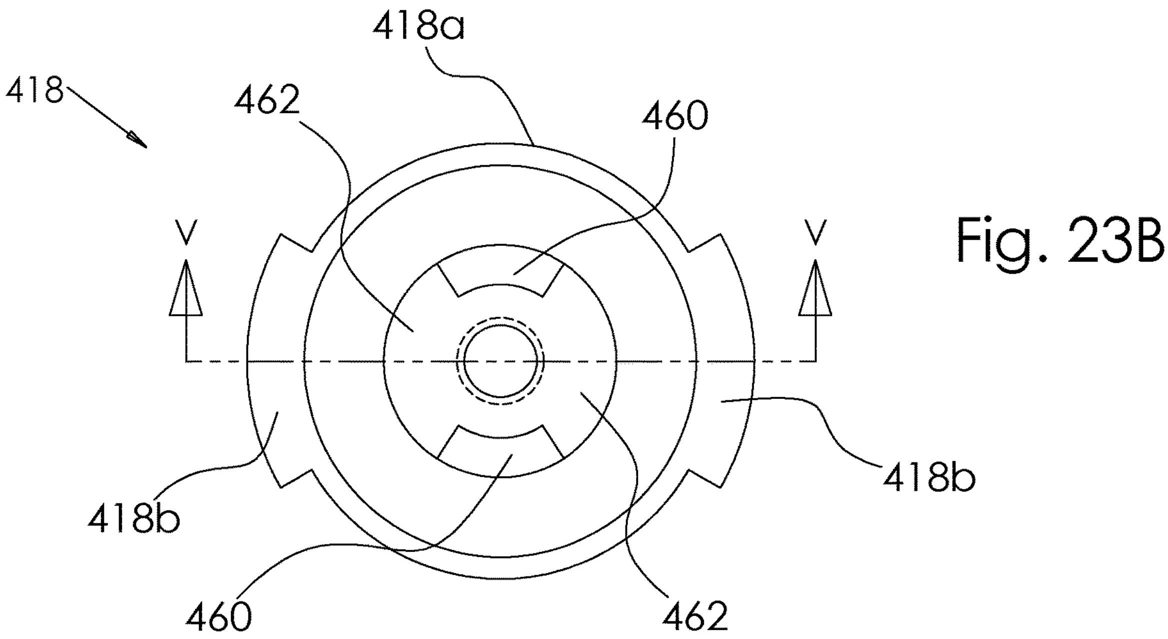
Figure 23C:
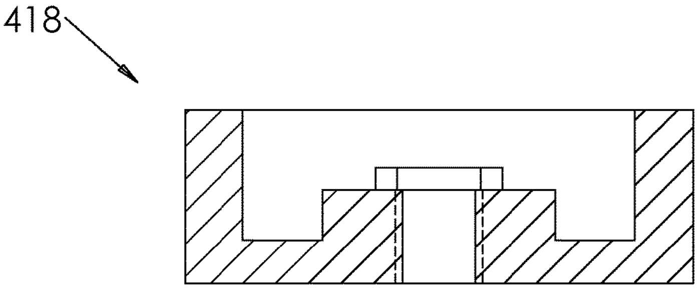

FIGS. 23A-23C illustrate second bracket 418 for detent hinge device 410 in accordance with one embodiment. In one embodiment, second bracket 418 similarly includes barrel portion 418*a* and drive tab portions 418*b*. In the illustration, two drive tab portions 418*b* are shown for detent hinge device 410 to an application, such as by inserting second bracket 418 in an opening in a second hinged element that has a matching profile.

In one embodiment, barrel portion 418*a* includes splines 460 on its inner surface, which are separated by grooves 462. In one embodiment, barrel portion 418*a* of second bracket 418 is slid over second cam component 432 such that splines 460 mate with splines 450 from second cam component 432. The splines 450/460 and grooves 452/462 of second bracket 418 and second cam component 432 respectively mate such that there is minimal relative rotation between them about bolt 420.

Figure 26:
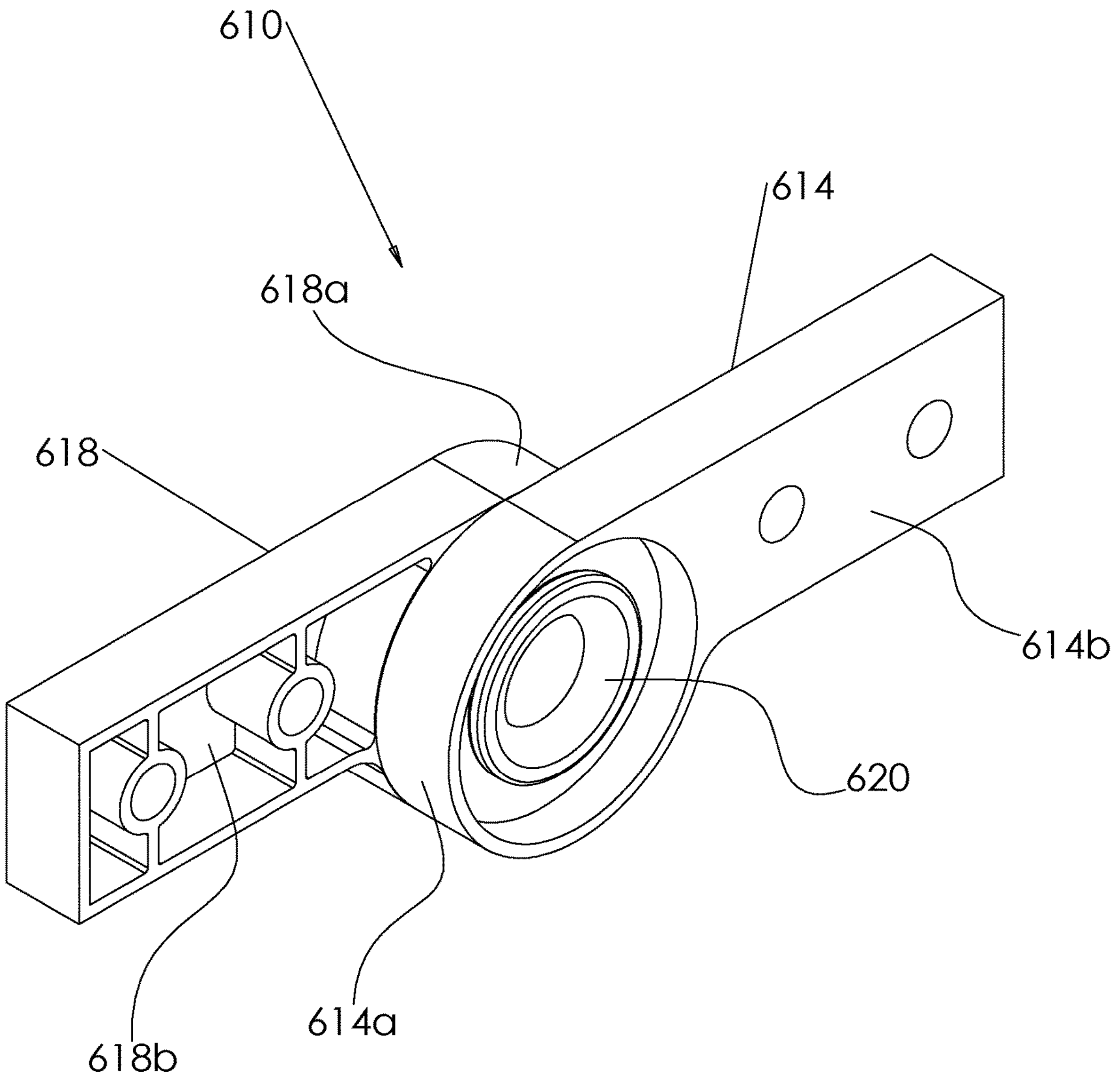
FIG. 26 illustrates a perspective view of a detent hinge device in accordance with one embodiment.

FIG. 26 illustrates a 90 degree asymmetric embodiment detent hinge device 610. In one embodiment, detent hinge device 610 includes first and second brackets 614 and 618. Brackets 614 and 618 can be connected to various bodies in order to hinge one body relative to another. For example, first bracket 614 can be attached to a table or base, while second bracket 618 is attached to a tray or shelf. In one embodiment, the characteristic of detent hinge device 610 can provide a breakaway for the table, such that when a predetermined force is applied to the table, it will break away and fold down. In one embodiment, detent hinge device 610 incorporates a torque engine with cam components having cam surfaces to enable smooth and controlled movement between detent positions, maximizing torque, minimizing wear, and improve the overall user experience.

Figure 27:
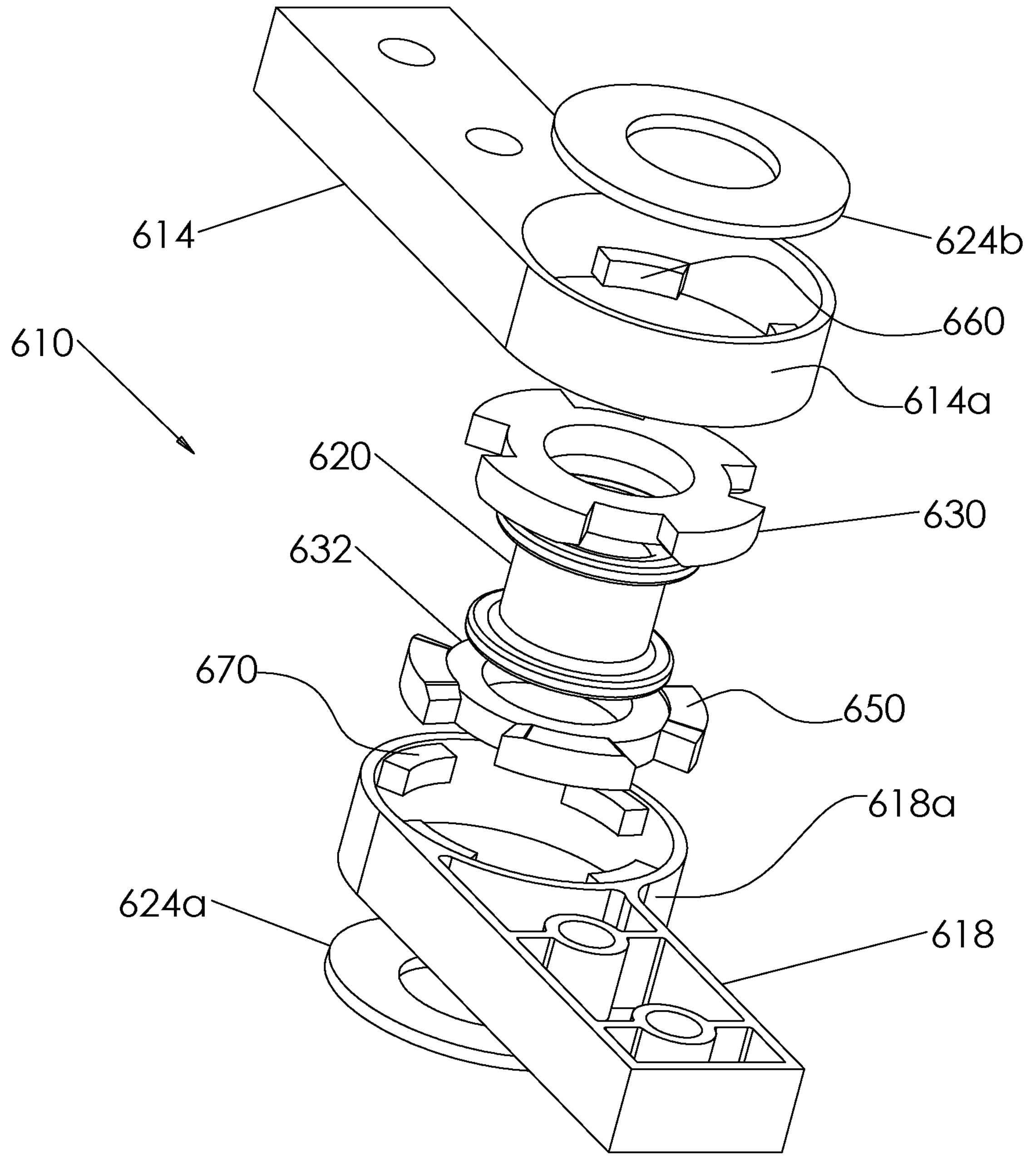
FIG. 27 illustrates an exploded view of the detent hinge device of FIG. 27 in accordance with one embodiment.

FIG. 27 illustrates and exploded view of detent hinge 610 in accordance with one embodiment. In this view, the various components of detent hinge device 610 are visible. In one embodiment, detent hinge device 610 includes first and second brackets 614 and 618, riveted shaft 620, disc spring washers 624*a* and 624*b*, and first and second cam components 630 and 632. In one embodiment, first bracket 614 includes barrel portion 614*a* and drive arm portion 614*b*, and second bracket 618 includes barrel portion 618*a* and drive arm portion 618*b*.

In one embodiment, first bracket 614 is attached to a first hinged element and second bracket 618 is attached to a second hinged element. Drive arm portion 614*b* is fixed to the first hinged element such that first bracket 614 is relatively fixed thereto. Similarly, drive tab portion 618*b* is fixed to the second hinged element such that second bracket 618 is relatively fixed thereto.

Figure 28A:
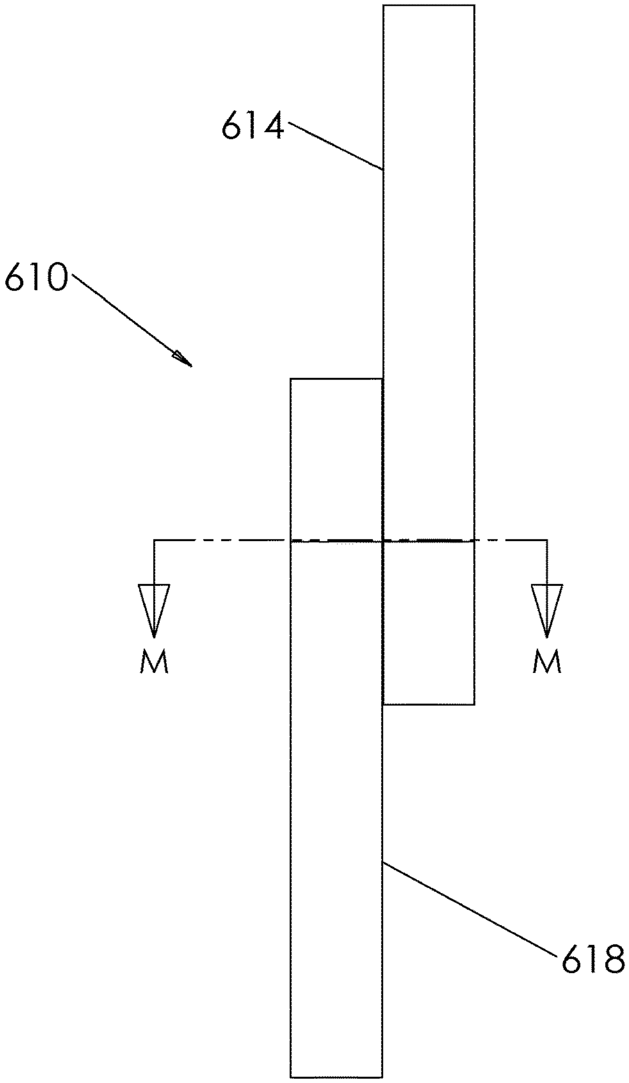
FIG. 28A illustrates a side view of the detent hinge device of FIG. 26 in accordance with one embodiment.
Figure 28B:
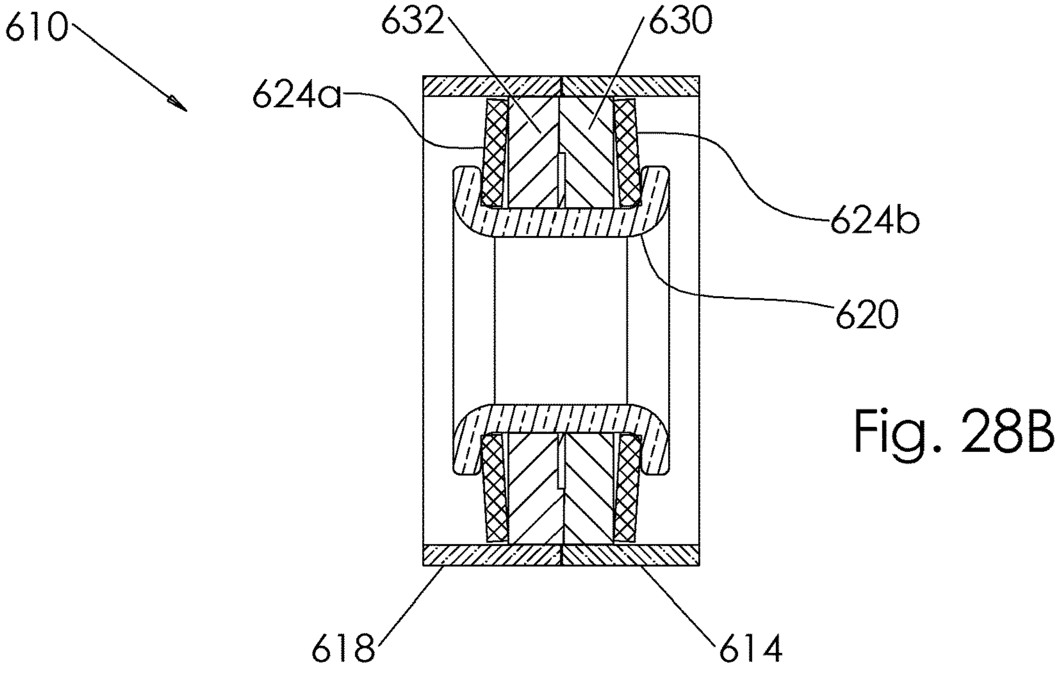
FIG. 28B illustrates a sectional view of the detent hinge device of FIG. 28A taken at line M-M in accordance with one embodiment.

FIG. 28A illustrates detent hinge device 610, and includes reference line M-M. FIG. 28B illustrates a sectional view of detent hinge device 610 taken at line M-M in FIG. 28A in accordance with one embodiment. In one embodiment, when assembled detent hinge device 610 includes first and second cam components 630 and 632 coupled respectively within first and second brackets 614 and 618. In one embodiment, each of cam components 630 and 632 have a center hole through which riveted shaft 620 extends. Furthermore, disc spring washers 624*a* and 624*b* are secured axially with riveted shaft 620 on either side of first and second cam components 630 and 632. Rivet shaft length can adjust spring preload and therefore breakaway torque of hinge 610.

As will be further discussed below, each of first and second cam components 630 and 632 include cam faces. The cam faces of first and second cam components 630 and 632 are oriented toward each other. In one embodiment, disc spring washers 624*a* and 624*b* apply an inward compression force that acts on first and second cam components 630 and 632, keeping the cam faces forced against each other.

In operation, when first and second brackets 614 and 618 are rotated relative to each other, second cam component 632 does not relative to second bracket 618, transmitting torque through a drive feature or spline interface (further discussed below) to second bracket 618. Meanwhile, first cam components 630 travels axially, compressing disc spring washers 624*a* and 624*b* and sliding in the bracket splines and does not rotate relative to first bracket 614, and transmits torque to the first bracket 614 through a spline interface.

In one embodiment, detent hinge device 610 provides asymmetric torque and provides unique torque profiles in both directions of relative rotation of first and second brackets 614 and 618 over 90 degrees of relative rotation. In one embodiment, both of first and second cam components 630 and 632 are identical parts, they are all shaped the same and are manufactured the same way. Because all cam components are shaped the same, identically shaped dies are used for all components. Using identical parts for each of cam components 630 and 632 significantly improves cost in needing only a single part to function in two different locations of detent hinge device 610. It also lowers tooling and inventory cost. Furthermore, it eliminates the risk of assembling the wrong cams in the wrong places.

Figure 29A:
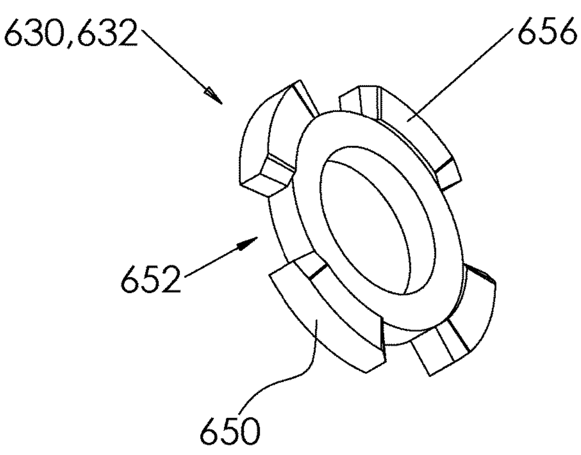
FIGS. 29A-29B illustrate a cam component for a detent hinge device in accordance with one embodiment.
Figure 29B:
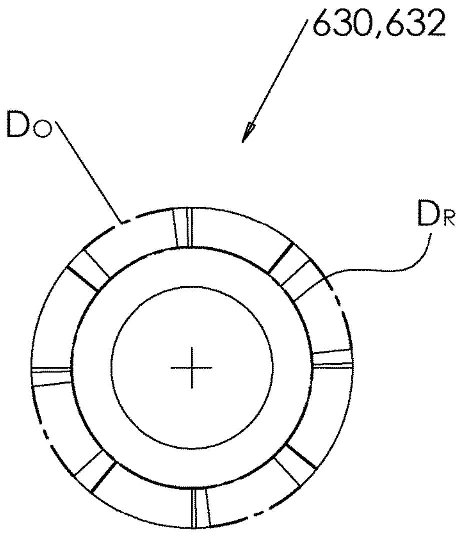

FIGS. 29A-29B illustrate first and second cam components 630 and 632 for detent hinge device 610 in accordance with one embodiment. In one embodiment, each of first and second cam components 630 and 632 are common, so only one part is illustrated in the figures since it describes both components. In one embodiment, first and second cam components 630 and 632 include four splines 650 each separated by grooves 652 on their outer periphery. In one embodiment, first and second cam components 630 and 632 include cam face 656, which have ramped portions that retract into face 656.

As illustrated in FIG. 29B, first and second cam components 630 and 632 include a root diameter $D_R$ and an outer diameter $D_O$. As illustrated, splines 650 extend radially outward from the root diameter $D_R$ to the outer diameter $D_O$. Grooves 652 separate the four splines 650. Splines 650, located between the root diameter $D_R$ and an outer diameter $D_O$, are the drive transfer portion of first and second cam components 630 and 632. When cam components 630 and 632 engage complementary splines in brackets 614 and 618, relative rotation of the brackets drives the splines 650 of cam components 630 and 632, thereby transmitting torque through a spline interface with the brackets.

In one embodiment, the outer diameter $D_O$ of each of disc spring washers 624*a* and 624*b* is larger than the root diameter $D_R$ of cam components 630 and 632. In one embodiment, the outer diameter $D_O$ of each of disc spring washers 624*a* and 624*b* is approximately the same as the outer diameter $D_O$ of cam components 630 and 632. As such, each of disc spring washers 624*a* and 624*b* presses on the splines 650, which occupy the radial area around the perimeter of cam components 630 and 632 between the root diameter $D_R$ and an outer diameter $D_O$. This allows more volume disc spring washers 624*a* and 624*b*, higher spring forces within a given detent hinge barrel size, giving higher torque density. Splines on inner brackets provide clearance for the spring ends throughout the linear cam motion.

Accordingly, detent hinge device 610 provides higher torque density, reduced package size, and improved cost.

Figure 30:
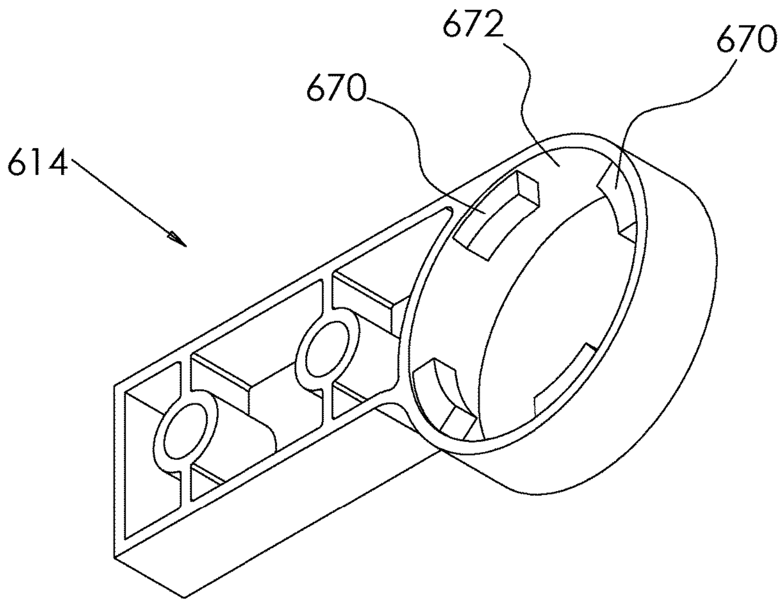
FIG. 30 illustrates a pivot bracket for a detent hinge device in accordance with one embodiment.

FIG. 30 illustrate first inner bracket 614 for detent hinge device 610 in accordance with one embodiment. In one embodiment, first bracket 614 includes barrel portion 614*a* and drive arm portion 614*b*. In the illustration, drive arm portion 614*b* of detent hinge device 610 can readily be attached to an application, such as by screwing first bracket 614 to a first hinged element. Drive arm portion 614*b* is readily designed in any of a variety of ways to couple detent hinge device 610 to applications where it is desired to rotate one body relative to another.

In one embodiment, barrel portion 614*a* includes four drive features such as splines 660 on its inner surface, which are separated by grooves 672. In one embodiment, barrel portion 614*a* of first bracket 614 is slid over first cam component 630 such that splines 670 mate with splines 650 from first cam component 630. The splines 650/670 and grooves 652/672 of first bracket 614 and first cam component 630 respectively mate such that there is minimal relative rotation between them about riveted shaft 620.

Similarly, second bracket 618 includes barrel portion 618*a* and drive arm portion 618*b*, and barrel portion 618*a* also includes splines on its inner surface, which are separated by grooves. In one embodiment, barrel portion 618*a* of second bracket 618 is slid over second cam component 632, such that splines and grooves of second inner bracket 618 and second cam component 632 respectively mate such that there is minimal relative rotation between them about riveted shaft 620.

Figure 31:
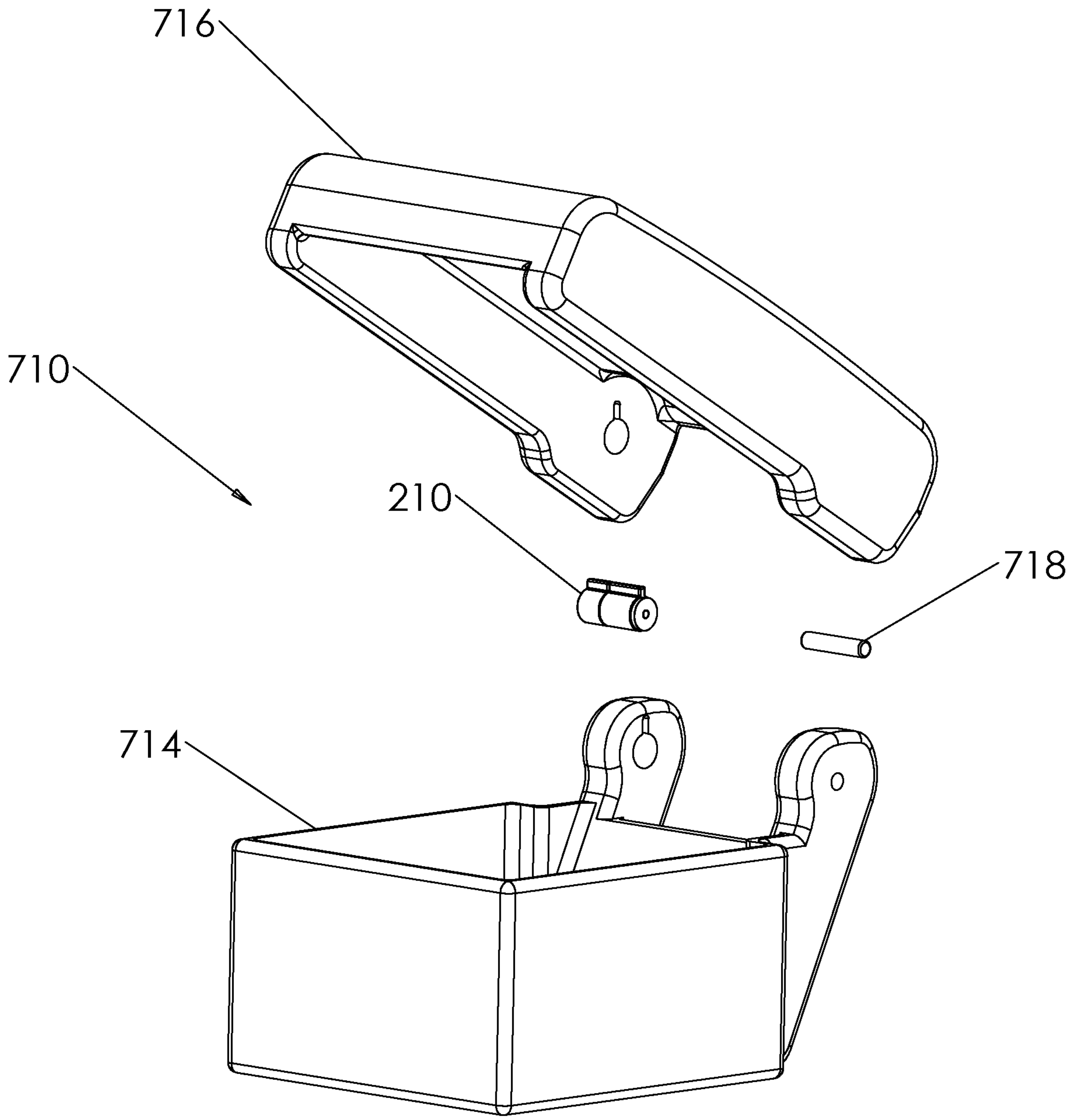
FIG. 31 illustrates an exploded view of a hinged system in accordance with one embodiment.

FIG. 31 illustrates a hinged system 710 in accordance with one embodiment. In one embodiment, hinged system 710 includes base 714, hinged cover 716, shaft 718 and detent hinge device 210. In one embodiment, hinged system 710 is a center console in an automobile. In one embodiment, detent hinge device 210 provides consistent and predictable detent hinge torque for opening and closing hinged cover 716 on base 714. In one embodiment, detent hinge device 210 is configured such that hinged cover 716 is held closed against base 714 with the spring preload, where the cams are in or near their detent position. This requires a force is applied to overcome the preload force in order to open hinged cover 716. Any of detent hinge devices 10, 110, 210, 410, 610 can be adapted for use in a hinged system such as hinge system 710. Many applications can benefit from a similar hinge system as the one described. For example, automotive interior applications like load floors, arm rests, trays and tables, glove boxes and other lids. Also other lids and covers like 3D printers, lab equipment with monitors and screens Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A detent hinge device comprising:

a first cam component comprising at least one spline drive and an axial cam face, the at least one spline drive located between a root diameter and an outer diameter of the first cam component;

a second cam component comprising at least one spline drive and an axial cam face, the at least one spline drive located between a root diameter and an outer diameter of the second cam component;

wherein each of the first and second cam components are aligned on an axis, wherein the axial cam faces of the first and second cam components face each other;

an axial spring acting on at least one of the first and second cam components thereby forcing the first and second cam components together, wherein an outer diameter of the spring is larger than the root diameter of the first and second cam components thereby engaging the at least one spline drive of the at least one of the first and second cam components;

an axial retention fastener securing each of the first and second cam components and the axial spring on the axis;

a first bracket comprising drive features on an inner surface, wherein the first bracket contains the first cam component such that the drive features of the first bracket engage the at least one spline drive of the first cam component thereby transferring torque from the first cam component to the first bracket via the at least one spline drive with rotation of the first cam component and the first bracket; and a second bracket comprising drive features on an inner surface, wherein the second bracket contains the second cam component such that the drive features of the second bracket engage the at least one spline drive of the second cam component thereby transferring torque from the second cam component to the second bracket via the at least one spline drive with rotation of the first cam component and the first bracket; and wherein a common cam component is used for each of the first and second cam components.

2. The detent hinge device of claim 1, wherein the drive features of the first bracket have a clearance fit with the at least one spline drive of the first cam component thereby also allowing axial motion of the first cam component as the first and second cam components rotate relative each other.

3. The detent hinge device of claim 1, wherein the outer diameter of the axial spring is substantially the same as the outer diameter of the first and second cam components.

4. The detent hinge device of claim 1, wherein the axial spring is a compression spring or a Bellville spring washer.

5. The detent hinge device of claim 1, wherein the axial retention fastener is a threaded bolt, a riveted shaft, or a press fit shaft.

6. The detent hinge device of claim 1, wherein rotating the first bracket relative to the second bracket produces symmetric torque in each direction of relative rotation.

7. The detent hinge device of claim 1, wherein rotating the first bracket relative to the second bracket produces asymmetric torque in each direction of relative rotation.

8. A detent hinge device comprising:

a first outer cam component comprising a plurality of splines and a cam face, the first outer cam component having a root diameter and an outer diameter;

a second outer cam component comprising a plurality of splines and a cam face, the second outer cam component having a root diameter and an outer diameter;

a first inner cam component comprising a plurality of splines and a cam face, the first inner cam component having a root diameter and an outer diameter;

a second inner cam component comprising a plurality of splines and a cam face, the second inner cam component having a root diameter and an outer diameter;

wherein each of the first and second inner and outer cam components are aligned on an axis, wherein the cam faces of the first inner and first outer cam components face each other, and wherein the cam faces of the second inner and second outer cam components face each other;

an axial spring located between the first and second inner cam components and having an outer diameter, wherein the outer diameter of the spring is larger than the root diameter of the first and second inner cam components thereby engaging the splines of the first and second inner cam components;

an axial retention fastener securing each of the first and second inner and outer cam components and the axial compression spring on the axis; and a first outer bracket comprising splines on an inner surface, the first outer bracket containing the first outer cam component such that the splines of the first outer bracket engage the splines of the first outer cam component;

a second outer bracket comprising splines on an inner surface, the second outer bracket containing the second outer cam component such that the splines of the second outer bracket engage the splines of the second outer cam component;

a first inner bracket comprising splines on an inner surface, the first inner bracket containing the first inner cam component such that the splines of the first inner bracket engage the splines of the first inner cam component;

a second inner bracket comprising splines on an inner surface, the second inner bracket containing the second inner cam component such that the splines of the second inner bracket engage the splines of the second inner cam component; and wherein a common cam component is used for each of the first and second inner and outer cam components.

9. The detent hinge device of claim 8, wherein the splines of at least one of the first inner and outer brackets have a clearance fit with the splines of the first inner or outer cam components thereby also allowing axial motion of the first inner or outer cam component as the first inner and outer cam components rotate relative each other.

10. The detent hinge device of claim 8, wherein the outer diameter of the axial spring is substantially the same as the outer diameter of the first and second inner cam components.

11. The detent hinge device of claim 8, wherein rotating the first and second inner brackets relative to the first and second outer brackets produces symmetric torque in each direction of relative rotation.

12. The detent hinge device of claim 8, wherein rotating the first and second inner brackets relative to the first and second outer brackets produces asymmetric torque in each direction of relative rotation.

13. A hinged system comprising:

a base;

a hinged member hinged to the base such that it is rotatable relative to the base; and a detent hinge device coupled between the base and the hinged member;

wherein the detent hinge device comprises:

a first cam component comprising at least one spline drive and an axial cam face, the at least one spline drive located between a root diameter and an outer diameter of the first cam component;

a second cam component comprising at least one spline drive and an axial cam face, the at least one spline drive located between a root diameter and an outer diameter of the second cam component;

wherein each of the first and second cam components are aligned on an axis, wherein the cam faces of the first and second cam components face each other;

an axial spring acting on at least one of the first and second cam components thereby forcing the first and second cam components together;

an axial retention fastener securing each of the first and second cam components and axial spring on the axis; and wherein a common cam component is used for each of the first and second cam components and wherein the outer diameter of the spring is larger than the root diameter of the first and second cam components thereby engaging the at least one spline drive of the at least one of the first and second cam components.

14. The hinged system of claim 13 further comprising:

a first bracket coupled to the base and comprising drive features on an inner surface, wherein the first bracket contains the first cam component such that the drive features of the first bracket engage the at least one spline drive of the first cam component thereby transferring torque from the first cam component to the first bracket via the at least one spline drive with rotation of the first cam component and the first bracket; and a second bracket coupled to the hinged member and comprising drive features on an inner surface, wherein the second bracket contains the second cam component such that the drive features of the second bracket engage the at least one spline drive of the second cam component thereby transferring torque from the second cam component to the second bracket via the at least one spline drive with rotation of the first cam component and the first bracket.

15. The hinged system of claim 13, wherein the outer diameter of the axial spring is substantially the same as the outer diameter of the first and second cam components.

16. The hinged system of claim 14, wherein the drive features of the first bracket have a clearance fit with the at least one spline drive of the first cam component thereby also allowing axial motion of the first cam component as the first and second cam components rotate relative each other.

* * * * *